United States Patent
Matolia et al.

(10) Patent No.: US 12,289,797 B2
(45) Date of Patent: Apr. 29, 2025

(54) DYNAMIC PROFILE AND RADIO ACCESS TECHNOLOGY SELECTION BASED ON APPLICATION NETWORK SLICE REQUIREMENTS

(71) Applicant: Apple Inc., Cupertino, CA (US)

(72) Inventors: Rohit R. Matolia, Bangalore (IN); Alosious Pradeep Prabhakar, Singapore (SG); Vijay Venkataraman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 492 days.

(21) Appl. No.: 17/656,216

(22) Filed: Mar. 23, 2022

(65) Prior Publication Data
US 2023/0308855 A1    Sep. 28, 2023

(51) Int. Cl.
| | |
|---|---|
| *H04W 4/60* | (2018.01) |
| *H04W 4/50* | (2018.01) |
| *H04W 8/18* | (2009.01) |
| *H04W 36/06* | (2009.01) |
| *H04W 48/18* | (2009.01) |
| *H04W 60/04* | (2009.01) |
| *H04W 80/02* | (2009.01) |
| *H04W 88/06* | (2009.01) |

(52) U.S. Cl.
CPC ............ *H04W 8/183* (2013.01); *H04W 4/50* (2018.02); *H04W 36/06* (2013.01); *H04W 48/18* (2013.01); *H04W 60/04* (2013.01); *H04W 80/02* (2013.01); *H04W 88/06* (2013.01)

(58) Field of Classification Search
CPC ......... H04L 9/00; H04L 67/306; H04L 12/00; H04L 67/141; H04W 4/60; H04W 48/18; H04W 12/72; H04W 12/126; H04W 12/43
See application file for complete search history.

(56) References Cited

U.S. PATENT DOCUMENTS

| | | |
|---|---|---|
| 10,863,344 B2 | 12/2020 | Palaniappan et al. |
| 11,172,406 B2 | 11/2021 | Hampali et al. |
| 2022/0132299 A1* | 4/2022 | Bhowmik ............. H04W 76/10 |

FOREIGN PATENT DOCUMENTS

WO    2021258287 A1    12/2021

* cited by examiner

Primary Examiner — Tu X Nguyen
(74) Attorney, Agent, or Firm — DICKINSON WRIGHT RLLP

(57) ABSTRACT

Embodiments described herein relate to wireless communications, including methods and apparatus for dynamically selecting subscriber identity module (SIM) profiles, electronic SIM (eSIM) profiles, multi-SIM operating modes, and/or wireless access networks for network slice based applications of wireless devices. A wireless device can include at least two SIM/eSIM profiles and switch use of SIM/eSIM profiles, change between dual SIM operating modes, and/or select a registration mode based on requirements of one or more applications in use and availability of network slices via different wireless networks.

20 Claims, 18 Drawing Sheets

DYNAMIC PROFILE AND RADIO ACCESS TECHNOLOGY SELECTION BASED ON APPLICATION NETWORK SLICE REQUIREMENTS

FIELD

The described embodiments relate to wireless communications, including methods and apparatus for dynamically selecting subscriber identity module (SIM) profiles, electronic SIM (eSIM) profiles, multi-SIM operating modes, and/or wireless access networks for network slice based applications of wireless devices. A wireless device can include at least two SIM/eSIM profiles and switch use of SIM/eSIM profiles, change between dual SIM operating modes, and/or select a registration mode based on requirements of one or more applications in use and availability of network slices via different wireless networks.

BACKGROUND

Newer generation, fifth generation (5G), cellular wireless networks that implement one or more 3$^{rd}$ Generation Partnership Project (3GPP) standards are rapidly being developed and deployed by mobile network operators (MNOs) worldwide. In addition, sixth generation (6G) standards are in active development. The newer cellular wireless networks provide a range of packet-based services, with 5G (and 6G) technology providing increased data throughput and lower latency connections that promise enhanced mobile broadband services for 5G-capable (and 6G-capable) wireless devices. Wireless local area networks, such as Wi-Fi networks, additionally provide access to communication network services, including cellular based services, such as Wi-Fi calling. Access to cellular services provided by an MNO, including access via a non-cellular wireless network such as Wi-Fi, by a wireless device can require access to cellular credentials and/or secure processing provided by a secure element (SE), such as by an embedded universal integrated circuit card (eUICC) included in the wireless device.

Typically, wireless devices have been configured to use removable universal integrated circuit cards (UICCs) that provide access to services of an MNO. In particular, each UICC includes at least a microprocessor and a read-only memory (ROM), where the ROM is configured to store an MNO profile, also referred to as subscriber identity module (SIM) or SIM profile, which the wireless device can use to register and interact with an MNO to obtain wireless services via a cellular wireless network. The SIM profile hosts subscriber data, such as a digital identity and one or more cryptographic keys, to allow the wireless device to communicate with a cellular wireless network. Typically, a UICC takes the form of a small removable card, commonly referred to as a SIM card or physical SIM (pSIM) card, which can be inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. The use of multiple SIMs and/or eSIMs is expected to offer flexibility for access to multiple services of multiple wireless networks.

A multi-SIM/eSIM wireless device can register with different 5G wireless networks and request access to multiple network slices of the 5G wireless networks; however, some requested network slices may be unavailable on one or more of the 5G wireless networks when registration occurs. The multi-SIM/eSIM wireless device can request access to a rejected network slice subsequently, after a back-off time period. In a multi-SIM/eSIM wireless device configured to use only one SIM/eSIM at a time, an application can require access to a network slice that is not available via the SIM/eSIM in use. There exists a need to select dynamically a SIM/eSIM, a network slice, and/or a radio access technology to use to provide a data connection for an application.

SUMMARY

The described embodiments relate to wireless communications, including methods and apparatus for dynamically selecting subscriber identity module (SIM) profiles, electronic SIM (eSIM) profiles, multi-SIM/eSIM operating modes, and/or wireless access networks for network slice based applications of wireless devices. A wireless device can include at least two SIM/eSIM profiles and switch use of SIM/eSIM profiles, change between multi-SIM operating modes, and/or select a registration mode based on requirements of one or more applications in use and availability of network slices via different wireless networks.

A dual-SIM/eSIM wireless device can include two different SIMs/eSIMs associated with separate cellular wireless networks. The dual-SIM/eSIM wireless device can be configured to operate in a dual-SIM dual standby (DSDS) mode, in which only one transceiver is available for connections at a time. A user can designate one of the SIMs/eSIMs as a data-preferred SIM/eSIM, and the other SIM/eSIM as a non-data-preferred SIM/eSIM. The data-preferred SIM/eSIM is preferred for data connections for applications in use on the dual-SIM/eSIM wireless device. When an application requires use of a network slice that is unavailable via the data-preferred SIM/eSIM but is available via the non-data-preferred SIM/eSIM, the dual-SIM/eSIM wireless device can switch data connections temporarily to the non-data-preferred SIM/eSIM while the application requires use of the network slice. In some embodiments, user preference for switching data usage between the data-preferred SIM/eSIM and the non-data-preferred SIM/eSIM can be configured in advance or responsive to initiation of the application. Data connections can be switched back to the data-preferred SIM/eSIM when certain criteria are satisfied, such as when the network slice becomes available via the data-preferred SIM/eSIM, use of the application that requires the network slice ends, and/or reception of a higher priority connection, such as an incoming voice connection via the data-preferred SIM/eSIM, occurs. In some embodiments, when an application requires minimal interruption while using a network slice via a first SIM/eSIM, page monitoring for a second SIM/eSIM (or other potential interruptions while operating in a DSDS mode with the minimal interruption application in use) can be disabled or reduced to minimal requirements. In some cases, the second SIM/eSIM can be placed in a limited service mode. In some embodiments, when access to cellular wireless services of the second SIM/eSIM is available via a non-cellular wireless access, data connections of the first SIM/eSIM can be used to transport data for the second SIM/eSIM, e.g., by providing a virtual, internal hot spot non-cellular wireless access for the second SIM/eSIM to register, with data transported via a cellular data connection of the first SIM/eSIM.

A dual-SIM/eSIM wireless device can be configurable to operate in a DSDS mode, with only one transceiver active, or in a dual-SIM dual active (DSDA) mode, with two transceivers active simultaneously. In some embodiments, the dual-SIM/eSIM wireless device can use the DSDS mode by default to reduce power consumption. When an application requires use of a network slice via a first SIM/eSIM and the application also requires minimal interruption while in use, the dual-SIM/eSIM wireless device can switch from the DSDS mode to the DSDA mode while the application is in use to minimize interruptions of the first SIM/eSIM due to operations associated with a second SIM/eSIM, e.g., page monitoring and/or cellular network measurements. The dual-SIM/eSIM wireless device can also use the DSDA mode temporarily to perform network search and/or radio measurements when operating in an area of limited cell service or weak signal strength for a second SIM/eSIM while one or more applications with high priority data connections are in use via a first SIM/eSIM to minimize communication interruptions from the second SIM/eSIM impacting the one or more applications using the first SIM/eSIM.

A SIM/eSIM of a wireless device can allow for registration via multiple different wireless access networks, such as via a 3GPP cellular wireless access network and also via a non-3GPP non-cellular wireless access network, e.g., a Wi-Fi access network. When an application requires use of a network slice that is unavailable via a first wireless access network with which the wireless device is currently registered and the network slice is available via a second wireless access network with which the wireless device is currently not registered, the wireless device can register with the second wireless access network to gain access to use the network slice via the second wireless access network for the application. The wireless device can switch a data connection for the application from the second wireless access network back to the first wireless access network based on various criteria, such as when performance via the second wireless access network does not satisfy a performance threshold or the network slice preferred by the application becomes available via the first wireless access network. A default network slice via a default wireless access network can be used for data connections of an application by the wireless device when a preferred network slice is not available via any of multiple wireless access networks available to the wireless device.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
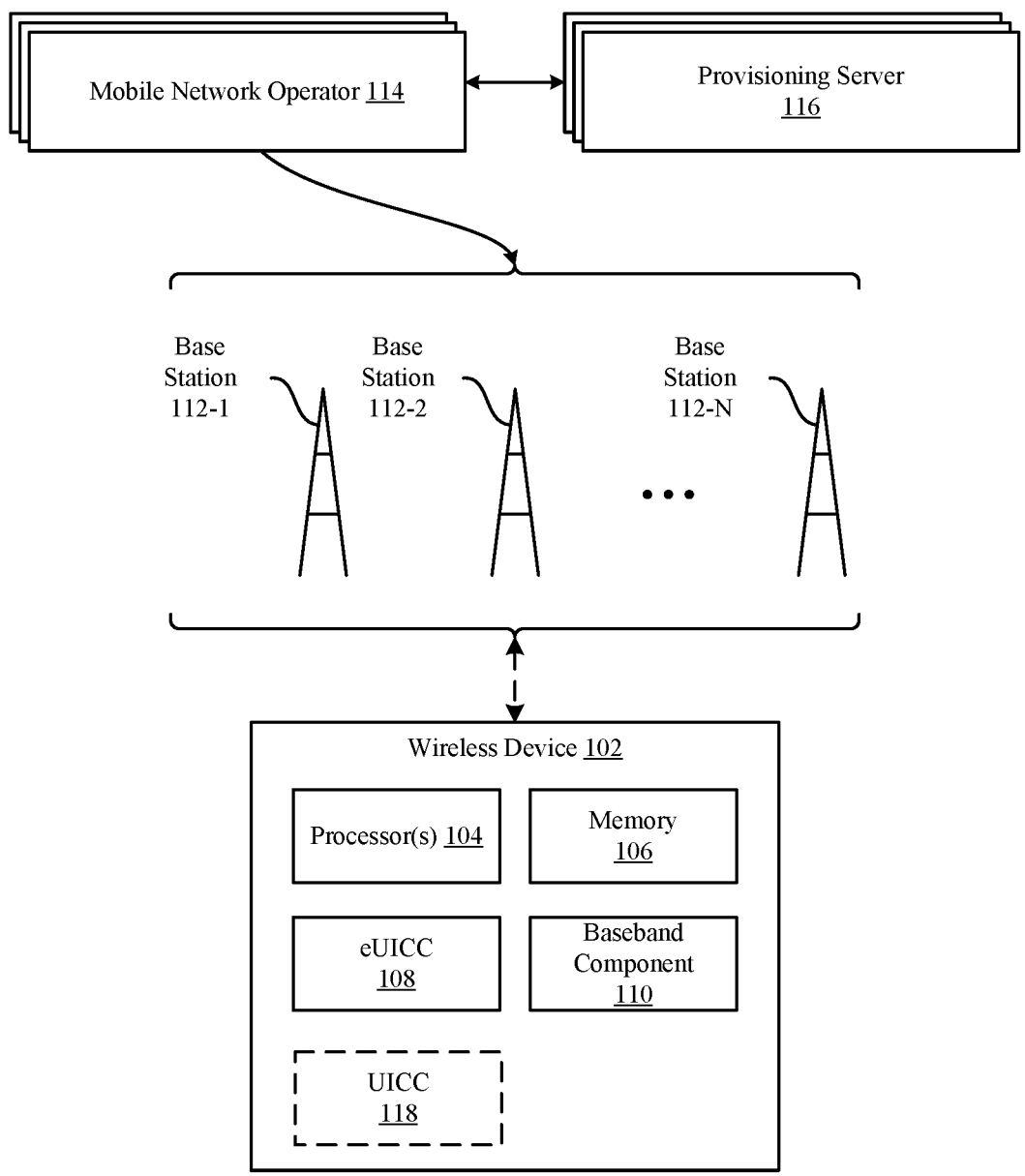
FIG. 1 illustrates a block diagram of different components of an exemplary system configured to implement cellular service access and provisioning for a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This application relates to wireless communications, including methods and apparatus for dynamically selecting subscriber identity module (SIM) profiles, electronic SIM (eSIM) profiles, multi-SIM/eSIM operating modes, and/or wireless access networks for network slice based applications of wireless devices. A wireless device can include at least two SIM/eSIM profiles and switch use of SIM/eSIM profiles, change between multi-SIM operating modes, and/or select a registration mode associated with a wireless access network based on requirements of one or more applications in use and available network slices via different wireless networks.

A dual-SIM/eSIM wireless device can include two different profiles realized as two removable universal integrated circuit cards (UICCs), also referred to as SIM cards, two eSIMs installed and enabled on an embedded UICC (eUICC), or a first SIM on a removable UICC and a second eSIM on an non-removable eUICC. Each of the two SIMs/eSIMs can be associated with distinct cellular wireless networks or with different subscriptions of a common cellular wireless network. The dual-SIM/eSIM wireless device can be configured to operate in a dual-SIM dual standby (DSDS) mode, in which only a single transceiver (transmitter/receiver combination) is actively used for cellular wireless connections at one time. In some embodiments, the dual-SIM/eSIM wireless device can also be configured to operate in a dual-SIM dual active (DSDA) mode in which two transceivers are available for parallel, simultaneous cellular wireless connections. The DSDA mode can consume more power because of the dual transceivers, and as such the DSDS mode can be preferred as a default mode in some embodiments.

Different SIMs/eSIMs can provide different services and can be associated with different cellular wireless networks or different subscriptions. 5G cellular wireless networks can be configured to provide an array of network slices, each network slice having a set of properties associated with quality of service, such as throughput, latency, error rate, guaranteed up-time, etc. Different network slices can be configured for use by different end user applications. A user a dual-SIM/eSIM wireless device (or more generally a multi-SIM/eSIM wireless device) can designate one of the SIMs/eSIMs as a data-preferred SIM/eSIM to be used for data connections by default, while the other SIM/eSIM (or SIMs/eSIMs) as a non-data-preferred SIM/eSIM. The data-preferred SIM/eSIM can be preferred for data connections for applications that require cellular wireless data connections while in use on the dual-SIM/eSIM wireless device. The data-preferred SIM/eSIM can be used for connections to a cellular wireless network, such as a 5G cellular wireless network that provides a set of network slices available for use by different applications on the dual-SIM/eSIM wireless device. Access to network slices, however, can be limited based on a user's cellular wireless subscription or based on network conditions, such as network loading. In some cases, a network slice preferred for an application may be unavailable for use via the data-preferred SIM/eSIM when use of the application is initiated.

When an application requires use of a network slice that is unavailable via the data-preferred SIM/eSIM but is available via the non-data-preferred SIM/eSIM, the dual-SIM/eSIM wireless device, while in a DSDS mode that permits data connections via only one cellular wireless network at a time, can switch data connections to the non-data-preferred SIM/eSIM while the application requires use of the network slice via the non-data-preferred SIM/eSIM. In some embodiments, a user preference for switching data usage between the data-preferred SIM/eSIM and the non-data-preferred SIM/eSIM can be configured in advance, such as via a settings switch, or responsive to initiation of the application, such as via a pop-up notification to the user indicating (or requesting permission) data switching between SIMs/eSIMs. Data connections of the DSDS mode, dual-SIM/eSIM wireless device can be switched back to the data-preferred SIM/eSIM when certain criteria are satisfied. Exemplary criteria for switching back to the data-preferred SIM/eSIM include: i) the application-preferred network slice becomes available via the data-preferred SIM/eSIM, ii) use of the application that requires the application-preferred network slice ends, iii) reception of a higher priority connection, such as an incoming voice connection, via the data-preferred SIM/eSIM occurs, and/or iv) reception of a high priority message, such as a public warning system (PWS) or emergency services message. After servicing the higher priority connection or message, data connections of the dual-SIM/eSIM wireless device, while operating in the DSDS mode, can be switched back from the data-preferred SIM/eSIM to the non-data-preferred SIM/eSIM to allow an application to continue to have access to an application-preferred network slice that is available via the non-data-preferred SIM/eSIM when not available via the data-preferred SIM/eSIM.

In some embodiments, when an application requires minimal interruption while using an application-preferred network slice via a first SIM/eSIM, page monitoring (or other network search and/or measurement activities) of a second SIM/eSIM (or of multiple other SIMs/eSIMs of a multi-SM/eSIM wireless device) can be disabled or reduced to minimal operational requirements. In some embodiments, an application cannot tolerate delay above a minimum, acceptable level for proper operation, and therefore interruptions from other services of the second SIM/eSIM can be suppressed. In some cases, the second SIM/eSIM can be placed in a limited service mode while the application is using the network slice via the first SIM/eSIM. In some embodiments, when access to cellular wireless services of the second SIM/eSIM is available via a non-cellular wireless access network, such as by using a voice over Wi-Fi service, cellular data connections of the first SIM/eSIM can be used to transport data for access to cellular services of the second SIM/eSIM. For example, the dual SIM/eSIM wireless device can register for access to cellular services of the second SIM/eSIM via an intra-device, virtual hot spot, non-cellular wireless connection with data being transported via cellular data connections of the first SIM/eSIM while the application that requires minimal interruption uses a cellular data connection via an application-preferred network slice of the cellular wireless network associated with the first SIM/eSIM.

A dual-SIM/eSIM wireless device can be dynamically configured to operate in a dual-SIM dual standby (DSDS) mode, with only one transceiver active, or in a dual-SIM dual active (DSDA) mode, with two transceivers active simultaneously based on various criteria. In some embodiments, the dual-SIM/eSIM wireless device can use the DSDS mode by default to reduce power consumption. When an application requires use of a network slice available via a first SIM/eSIM and the application also requires minimal interruption while in use, the dual-SIM/eSIM wireless device can switch from the DSDS mode to the DSDA mode while the application is in use. In the DSDA mode, the dual-SIM/eSIM wireless device can maintain a data connection for the application via the first SIM/eSIM and originate or terminate voice calls (or other voice and/or data connections) via the second SIM/eSIM without interrupting the application. The dual-SIM/eSIM wireless device can also use the DSDA mode temporarily to perform network search and/or radio measurements of wireless networks when operating in an area of limited cell service or weak signal strength for a second SIM/eSIM and one or more applications with high priority data connections via the first SIM/eSIM are in use, in order to minimize communication interruptions by the second SIM/eSIM activities impacting the one or more applications using the first SIM/eSIM. In some cases, when no service is available via the second SIM/eSIM, e.g., no suitable wireless cell is found on which to camp, the dual-SIM/eSIM wireless device can disable the second SIM/eSIM while an application is using a network slice via the first SIM/eSIM and requires minimal interruption while in use. The dual-SIM/eSIM wireless device can switch back from the DSDA mode to the DSDS mode when certain exit criteria are satisfied, e.g., when there's an indication that the application that required minimal interruption is no longer in use, such as after the application is closed (or crashes), or based on a display screen on/off status or on a sensor or device input mechanism that indicates the user no longer requires the application. In some cases, the dual-SIM/eSIM wireless device can switch between the DSDA mode and the DSDS mode based on activity monitoring of use of the application that requires the network slice with minimal interruption. In some embodiments, the dual-SIM/eSIM wireless device can switch to the DSDS mode when any SIM/eSIM of the dual-SIM/eSIM wireless device changes from using a 5G radio access technology to using a non-5G radio access technology. In some embodiments, when a non-cellular wireless connection, such as a Wi-Fi connection, is available for data connections or can provide a network slice having properties required by the application that requires minimal interruption, the dual-SIM/eSIM wireless device can remain in a DSDS mode while the non-cellular wireless connection is available and usable for the application.

In some embodiments, a SIM/eSIM of a wireless device can allow for registration via multiple wireless access networks, such as via a 3GPP cellular wireless access network and also via a non-3GPP non-cellular wireless access network, e.g., a Wi-Fi access network. In some cases, the wireless device can be configured to register with and use a particular wireless access network of the SIM/eSIM by default. In some cases, the wireless device can be configured to register with both wireless access networks in parallel. Network slices having particular properties can be available on one, both, or neither of two different wireless access networks associated with the SIM/eSIM. When an application requires use of a network slice that is unavailable via a first wireless access network with which the wireless device is currently registered and the network slice is available via a second wireless access network with which the wireless device is currently not registered, the wireless device can register with the second wireless access network to gain access to use the application-preferred network slice for the application. In some cases, the first wireless access network indicates the network slice is not available in a message sent in response to a request for access to an application-preferred network slice during registration or in response to a subsequent protocol data unit (PDU) request. The message can include a back-off timer value indicating a period of time during which the wireless device cannot request the network slice from the first wireless access network. After the back-off timer expires, the wireless device can send an additional request to the first wireless access network to gain access to the application-preferred network slice that was previously rejected. The wireless device can switch data connections for an application that prefers a particular network slice from the second wireless network back to the first wireless access network based on various exit criteria. Exemplary exit criteria include: i) performance via the second wireless access network does not satisfy a performance threshold, or ii) the network slice preferred by the application becomes available via the first wireless access network. A default network slice via a default wireless access network can be used for data connections of an application by the wireless device when a preferred network slice is not available for the application via any of the multiple wireless access networks available to the wireless device.

In some embodiments, when i) a preferred network slice is available via a non-3GPP wireless access network for a first SIM/eSIM, ii) the preferred network slice is unavailable via a 3GPP cellular wireless access network for the first SIM/eSIM, iii) the preferred network slice is unavailable via a 3GPP cellular wireless access network for a second SIM/eSIM, iv) the wireless device is operating in a DSDS mode allowing for cellular data connections to only one cellular wireless access network at one time, and v) an application requires access to the preferred network slice, the wireless device can switch (if required) existing cellular data connections to a cellular wireless network associated with the second SIM/eSIM. The DSDS wireless device can then register with the cellular wireless network associated with the first SIM/eSIM for access to the application-preferred network slice via an intra-device, virtual hot spot, non-3GPP non-cellular wireless access network connection (internal to the wireless device) using cellular data connections of the second SIM/eSIM to transport data for the non-cellular wireless access connection of the first SIM/eSIM. The DSDS wireless device can switch data connections back to the first SIM/eSIM when the application-preferred network slice becomes available for the first SIM/eSIM or is no longer required.

These and other embodiments are discussed below with reference to FIGS. 1 through 13; however, those skilled in the art will readily appreciate that the detailed description given herein with respect to these figures is for explanatory purposes only and should not be construed as limiting.

FIG. 1 illustrates a block diagram of different components of a system 100 that includes i) a wireless device 102, which can also be referred to as a mobile wireless device, a cellular wireless device, a wireless communication device, a mobile device, a user equipment (UE), a device, a primary wireless device, a secondary wireless device, an accessory wireless device, a cellular-capable wearable device, and the like, ii) a group of base stations 112-1 to 112-N, which are managed by different Mobile Network Operators (MNOs) 114, and iii) a set of provisioning servers 116 that are in communication with the MNOs 114. The wireless device 102 can represent a mobile computing device (e.g., an iPhone®, an iPad®, or an Apple Watch® by Apple®), the base stations 112-1 to 112-N can represent cellular wireless network entities including fourth generation (4G) Long Term Evolution (LTE) evolved NodeBs (eNodeBs or eNBs), fifth generation (5G) NodeBs (gNodeBs or gNBs), and/or sixth generation (6G) NodeBs that are configured to communicate with the mobile wireless device 102, and the MNOs 114 can represent different wireless service providers that provide specific services (e.g., voice, data, video, messaging) to which a user of the wireless device 102 can subscribe to access the services via the wireless device 102. Applications resident on the wireless device 102 can advantageously access services using 4G LTE connections, 5G connections, and/or 6G connections (when available) via the base stations 112. The wireless device 102 can include processing circuitry, which can include one or more processors 104 and a memory 106, an embedded Universal Integrated Circuit Card (eUICC) 108, and a baseband component 110. In some embodiments, the wireless device 102 can include one or more universal integrated circuit cards (UICCs) 118, also referred to as physical SIM cards, each UICC 118 including a SIM, in addition to or in place of the eUICC 108 providing one or more electronic SIMs (eSIMs). The one or more processors 104 can include one or more wireless processors, such as a cellular baseband component, a wireless local area network processor, a wireless personal area network processor, a near-field communication processor, and one or more system-level application processors. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple eSIMs for accessing services offered by one or more different MNOs 114 via communication through base stations 112-1 to 112-N. To be able to access services provided by the MNOs, one or more eSIMs can be provisioned to the eUICC 108 of the mobile wireless device 102. The wireless device 102 can include wireless circuitry, including the baseband component 110 and at least one transmitter/receiver, also referred to as a transceiver. In some embodiments, the wireless device 102 includes two or more transceivers. In some embodiments, the wireless device 102 can be configured to operate in a dual SIM dual standby (DSDS) mode, with two SIMs, one SIM and one eSIM, or two eSIMs enabled and active simultaneously, but allowing connections to only one cellular wireless network via a single, active transceiver at a time. In some embodiments, the wireless device 102 can be configured to operate in a dual SIM dual active (DSDA) mode, with two SIMs, one SIM and one eSIM, or two eSIMs enabled and active, and allowing cellular connections to two cellular wireless networks via two active transceivers simultaneously.

Figure 2:
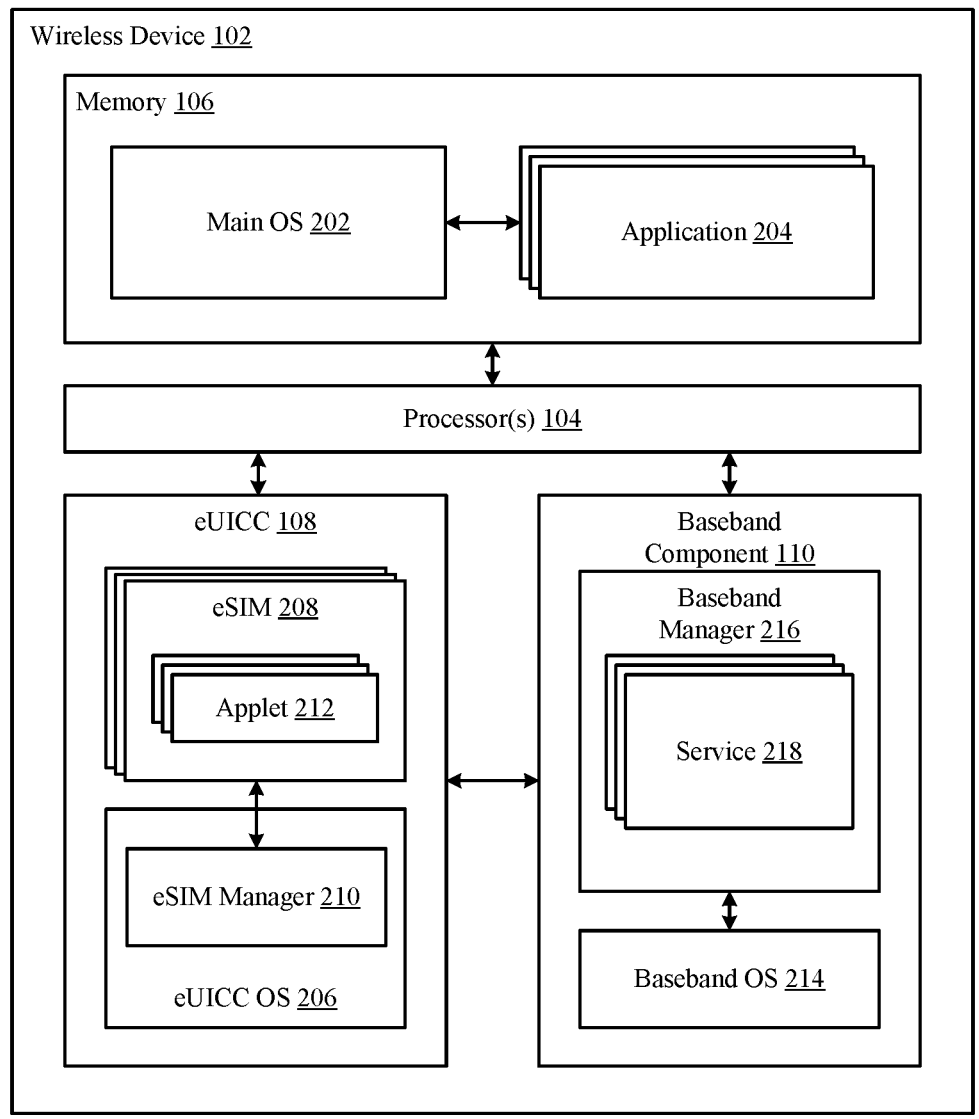
FIG. 2 illustrates a block diagram of a more detailed view of exemplary components of a mobile wireless device of the system of FIG. 1, according to some embodiments.

FIG. 2 illustrates a block diagram 200 of a more detailed view of exemplary components of a wireless device 102 of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth and/or latency, and provide information to the communications control circuitry to determine suitable wireless connections for use by particular applications. The communications control circuitry can process information from the applications processing circuitry as well as from additional circuitry, such as the baseband component 110, and other sensors (not shown) to determine states of components of the mobile wireless device 102, e.g., reduced power modes, as well as of the mobile wireless device 102 as a whole, e.g., mobility states, activity/inactivity states. The mobile wireless device 102 further includes an eUICC 108 that can be configured to implement an eUICC OS 206 to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, updating, or otherwise performing management of the eSIMs 208 within the eUICC 108 and providing the baseband component 110 with access to the eSIMs 208 to provide access to wireless services for the mobile wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

A baseband component 110 of the mobile wireless device 102 can include a baseband OS 214 that is configured to manage hardware resources of the baseband component 110 (e.g., a processor, a memory, different radio components, etc.). The baseband component 110 can also be referred to as a wireless baseband component, a baseband wireless processor, a cellular baseband component, a cellular component, and the like. According to some embodiments, the baseband component 110 can implement a baseband manager 216 that is configured to interface with the eUICC 108 to establish a secure channel with a provisioning server 116 and obtain information (such as eSIM data) from the provisioning server 116 for purposes of managing eSIMs 208. The baseband manager 216 can be configured to implement services 218, which represent a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Different applications 204 can require different properties for data connections that are provided by a cellular wireless network or non-cellular wireless network. A processor 104 of the wireless device 102 can communicate information regarding requirements for an application 204 to the baseband component 110, which can manage communication with wireless networks to obtain an appropriate data connection for the application 204. In some embodiments, a cellular wireless network, such as a 5G cellular wireless network, offers different network slices that have different properties, and an application can prefer a network slice having particular properties, such as regarding throughput, delay, guaranteed up-time, minimal (or threshold determined) interruptions, or other quality of service (QoS) parameters. The baseband component 110 can request a network slice from a cellular wireless network for use with an application 204, such as upon initiation of the application 204 or while the application 204 is in use. In some cases, a network slice can be available for an application via an eSIM 208 (or a SIM) and not be available via another eSIM 208 (or another SIM) in the wireless device 102, and one or more processors 104 and the baseband component 110 can manage data connections for the wireless device 102 to provide access to a preferred network slice for the application 204 as discussed further herein.

Figure 3A:
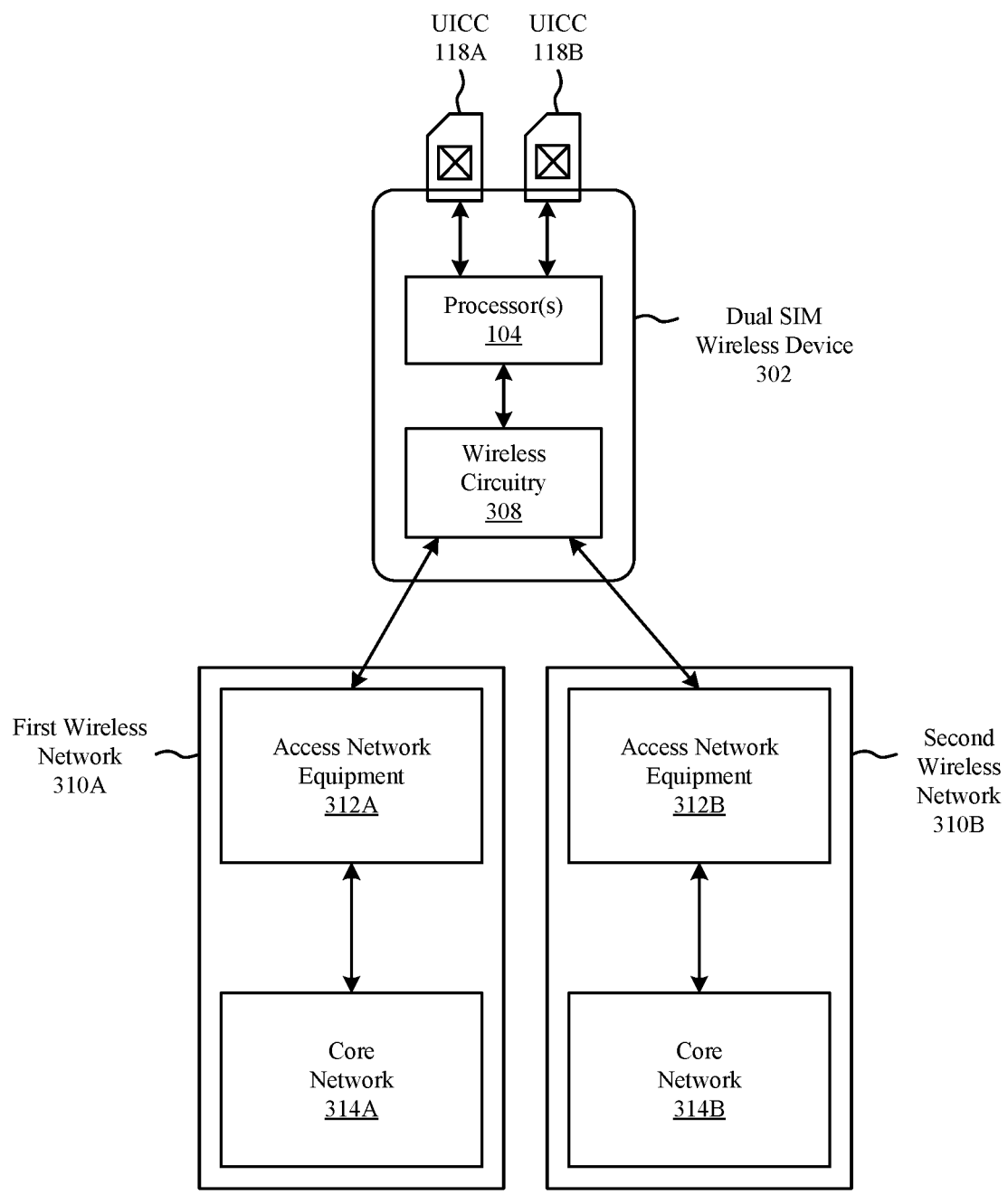
FIG. 3A illustrates a block diagram of an exemplary dual SIM wireless device in communication with two different wireless networks, according to some embodiments.

FIG. 3A illustrates a block diagram 300 of components of an exemplary dual SIM wireless device 302 including one or more processor(s) 104 and wireless circuitry 308 that provides for wireless radio frequency (RF) connections between the dual SIM wireless communication device 302 and a first wireless network 310A and a second wireless network 310B. In some embodiments, the wireless circuitry 308 includes one or more baseband component(s) 110, and a set of RF analog front-end circuitry. In some embodiments, the wireless circuitry 308 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless communication device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 308 can include components of RF analog front-end circuitry, e.g. a set of one or more antennas, which can be interconnected with additional supporting RF circuitry that can include filters and other analog components that can be "configured" for transmission and/or reception of analog signals via one or more corresponding antennas to one or more of the first and second wireless networks 310A/B. The processor(s) 104 and the wireless circuitry 308 can be configured to perform and/or control performance of one or more functionalities of the dual SIM wireless device 302, in accordance with various implementations. The processor(s) 104 and the wireless circuitry 308 can provide functionality for coordinating hardware/software resources in the dual SIM wireless communication device 302 to improve performance and reduce power consumption for mobility management of connections to one or more of the wireless networks 310A/B.

The dual SIM wireless communication device 302 includes two removable UICCs 118A/B, which can be inserted and removed from the dual SIM wireless device 302 together or independently. Each UICC 118A/B includes at least one software identity module (SIM), which can be embodied as a software/firmware program installed on the UICC 118A/B. Removable UICCs 118A/B can provide a user of the dual SIM wireless device 302 the ability to replace a UICC to change services, provided the dual SIM wireless device 302 supports such flexibility (e.g., an "unlocked" device that is not "locked" to a particular wireless network operator or service provider). Hardware complexity and/or a size of a wireless communication device can limit the ability to include multiple UICC slots, and thus additional arrangements for wireless devices are can include multiple SIMs on a single UICC 118 and/or eSIMs 208 on an eUICC 108 or combinations thereof. The dual SIM wireless device 302, in some embodiments, can register with two different wireless networks, e.g., the first and second wireless networks 310A/B, simultaneously. The wireless circuitry 308 of the dual SIM wireless device 302 can be configured to register with and/or establish a connection with the first wireless network 310A via access network equipment 312A, which interfaces with a core network 314A. The wireless circuitry 308 of the dual SIM wireless device 302 can also be configured to register with and/or establish a connection with the second wireless network 310B via access network equipment 312B, which interfaces with a core network 314B. In some embodiments, the wireless circuitry 308 of the dual SIM wireless device 302 supports simultaneous transmission and reception to both the first and second wireless networks 310A/B. In some embodiments, the wireless circuitry 308 of the dual SIM wireless device 302 supports transmission and reception to only one of the first and second wireless networks 310A/B at a time. In some embodiments, the wireless circuitry 308 of the dual SIM wireless device 302 supports transmission to only one of the first and second wireless networks 510A/B at a time and reception from one or both of the first and second wireless networks 310A/B. A dual SIM wireless device 302 that can connect to only one wireless network at a time but can monitor and/or receive communication from two wireless networks with which it is registered can be referred to as a "Dual SIM, Dual Standby" (DSDS) wireless communication device. A dual SIM wireless device 302 that can connect to two wireless networks simultaneously using two different subscriber identities can be referred to as a "Dual SIM, Dual Active" (DSDA) wireless communication device. In general the dual SIM wireless device 302 can be referred to as a "DSDx" wireless communication device, where "x" can indicate either "S" for "standby" or "A" or "active".

Figure 3B:
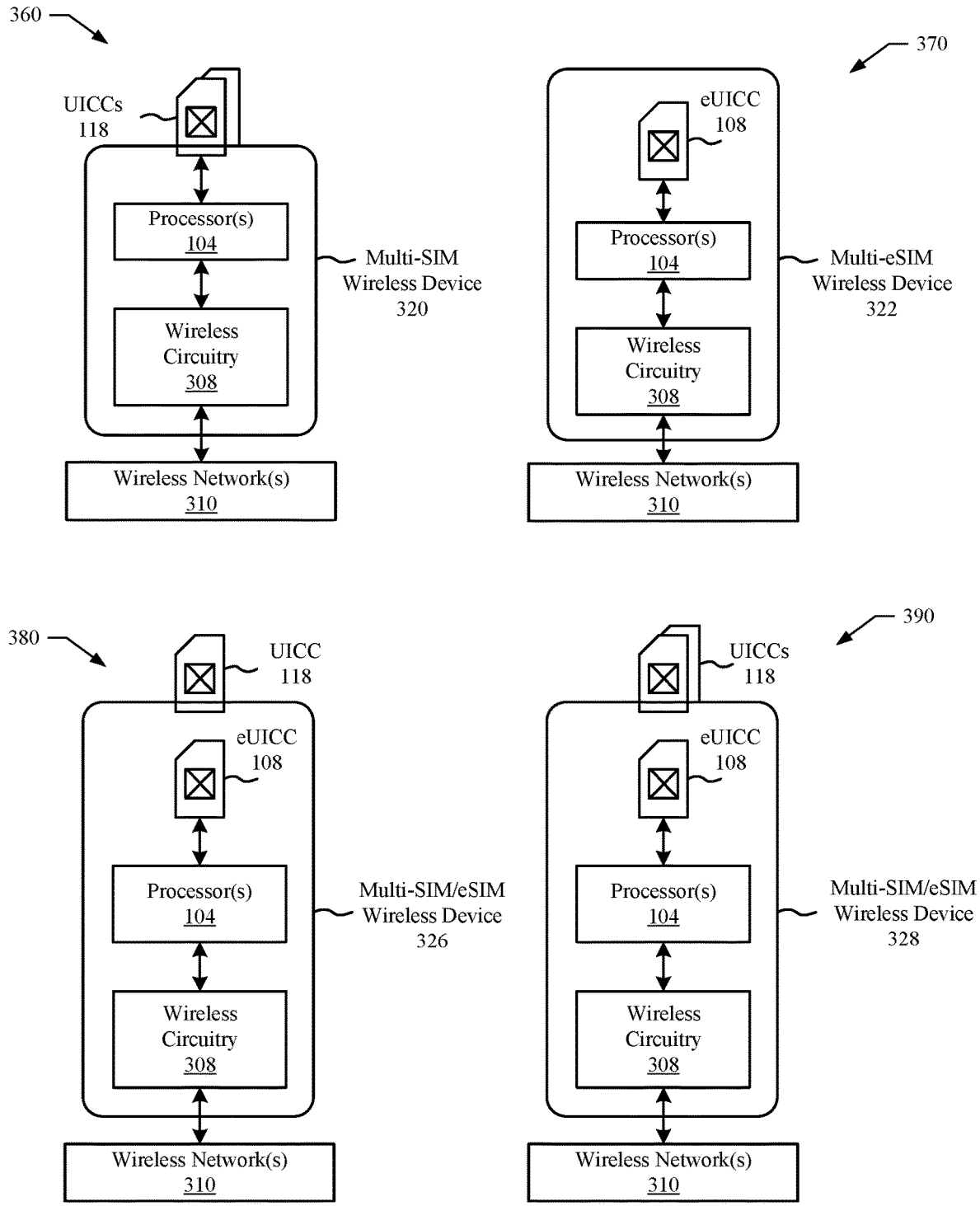
FIG. 3B illustrates block diagrams of exemplary multi-SIM and multi-SIM/eSIM wireless devices, according to some embodiments.

FIG. 3B illustrates diagrams 360, 370, 380, 390 of additional exemplary multi-SIM/eSIM wireless devices 320, 322, 326, 328 that support multiple subscriber identities using removable UICCs 118 and/or eUICCs 108 with SIMs or eSIMs 208 implemented respectively thereon. As illustrated in diagram 360, a multi-SIM wireless device 320 includes multiple UICCs 118, which can be inserted and removed individually or together, and communicate with one or more processors 104 that connect to wireless circuitry 308 that provides for wireless communication with one or more wireless networks 310. As the physical size and design of the multi-SIM wireless device 320 can limit the number of UICCs 118 that can be supported, alternatively as shown by diagram 370, a multi-eSIM wireless device 322 can include an eUICC 108 connected with the processor(s) 104 and to the wireless network(s) 310 via the wireless circuitry 308. The eUICC 108 can be built into the multi-eSIM wireless device 322 and can be not removable from the multi-eSIM wireless device 322, e.g., permanently affixed to a circuit board in the multi-eSIM wireless device 322. The eUICC 108 can be programmed such that one or more eSIMs 208 can be implemented on the eUICC 108. Each eSIM 208 can be associated with a distinct subscriber identity and/or provide distinct services or subscriptions for a user of the multi-eSIM wireless device 322. Diagram 380 illustrates a multi-eSIM/SIM wireless device 326 that includes a removable UICC 118, on which can be installed one or more SIMs, and an eUICC 108 on which one or more eSIMs 208 can be installed. The combination of SIMs on the UICC 118 and/or eSIMs 208 on the eUICC 108 can provide for connections to one or more wireless networks 310 using the wireless circuitry 308 under the control of the processor(s) 104 of the multi-SIM/eSIM wireless device 326. Diagram 390 illustrates another multi-eSIM/SIM wireless device 328 that includes multiple UICCs 118, on which one or more SIMs can be installed, and an eUICC 108, on which one or more eSIMs 208 can be installed. A combination of one or more SIMs on a UICC 118 and/or eSIMs on an eUICC 108 can provide for connections to one or more wireless networks 310 using the wireless circuitry 308 under the control of the processor(s) 104 of the multi-SIM/eSIM wireless device 328. In general, a wireless device 102 that supports multiple subscriber identities can include (i) at an eUICC 108 and/or (ii) one or more UICCs 118. Each UICC 118 can support one or more SIMs, and each eUICC 108 can support one or more eSIMs 208. A wireless device 102 that supports multiple subscriber identities, e.g., 302, 320, 322, 326, 328, can include a combination of SIMs and/or eSIMs 208 to support communication with one or more wireless networks 310.

Figure 4A:
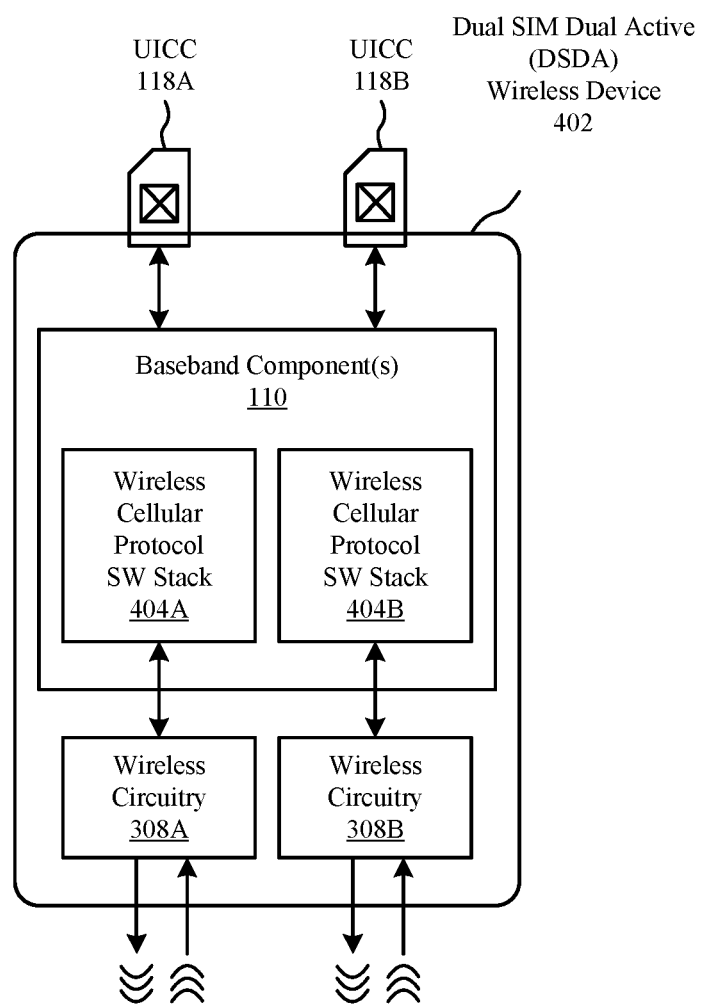
FIG. 4A illustrates a block diagram of an exemplary dual SIM dual active (DSDA) wireless device, according to some embodiments.

FIG. 4A illustrates a diagram 400 of a DSDA wireless device 402 that includes two removable UICCs 118A/B, on which at least two SIMs are installed, e.g., one SIM on each of the UICCs 118A/B. (While the DSDA wireless device 402 illustrated in FIG. 4A includes two UICCs 118A/B, alternative architectures for the DSDA wireless device 402 can include combinations of UICCs 118 and/or an eUICC 108 as discussed herein.) Each UICC 118A/B can communicate with one or more baseband components 110, e.g., via another processor 104 and/or directly. A first wireless cellular protocol software (SW) stack 404A on the one or more baseband component(s) 110 can communicate with a first wireless network 310A (not shown) via wireless circuitry 308A, while a second wireless cellular protocol SW stack 404B can communicate with a second wireless network 310B (not shown) via wireless circuitry 308B. With parallel wireless circuitry 308A/B, the DSDA wireless device 402 can interact with two wireless networks 310A/B independently without requiring an interface or interaction between the wireless cellular protocol SW stacks 304A/B. Each of the wireless cellular protocol SW stacks 304A/B can support communication using one or more wireless communication protocols. With sufficient parallel wireless circuitry 308A/B and parallel wireless cellular protocol SW stacks 304A/B, the DSDA wireless device 402 can be registered with two different wireless networks 310A/B and can form connections with the two different wireless networks 310A/B in parallel and independently. The DSDA wireless device 402 can receive notifications (e.g., paging messages and/or paging indications) from a second wireless network 310B while connected to a first wireless network 310A, as the parallel wireless circuitry 308A/B permits parallel, simultaneous communication to two different wireless networks 310A/B.

Figure 4B:
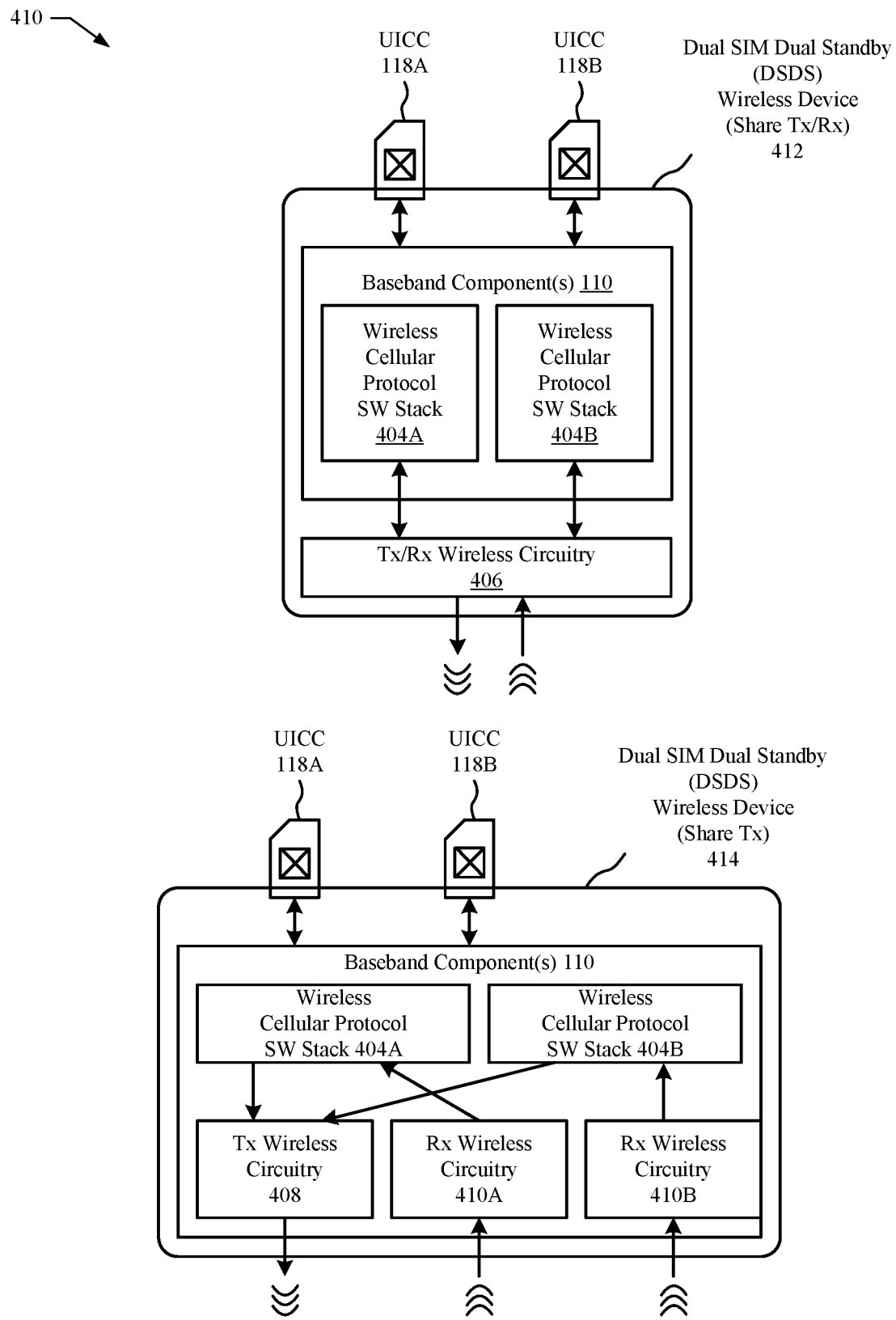
FIG. 4B illustrates block diagrams of exemplary dual SIM dual standby (DSDS) wireless devices, according to some embodiments.

FIG. 4B illustrates a diagram 410 of two exemplary configurations of DSDS wireless devices 412/414. (While the DSDS wireless devices 412/414 illustrated in FIG. 4B include two UICCs 118A/B, alternative architectures for the DSDS wireless devices 412/414 can include combinations of UICCs 118 and/or an eUICC 108 as discussed herein.) A DSDS wireless device 412 includes two removable UICCs 118A/B, on which at least two SIMS are installed, and each UICC 118A/B can communicate with one or more baseband components 110, on which two wireless cellular protocol software stacks 404A/B operate. Each wireless cellular protocol software stack 404A/B can communicate with a respective wireless network 310A/B (not shown) via a set of common transmit/receive (Tx/Rx) wireless circuitry 406. In some embodiments, the set of common Tx/Rx wireless circuitry 406 provides for transmission and/or reception by one wireless cellular protocol SW stack 404A or 404B at a time, and thus the DSDS wireless device 412 can be associated with two (or more) wireless networks 310A/B at the same time but not be able to communicate with both wireless networks 310A/B simultaneously. For example, the DSDS wireless device 412 can be configured to operate in a time division mode that shares the Tx/Rx wireless circuitry 406 among the wireless cellular protocol SW stacks 404A/B. In some embodiments, the wireless cellular protocol SW stacks 404A/B can both operate in an idle mode and listen for paging messages from each of two different wireless networks 310A/B (e.g., alternate listening for paging messages from each wireless network 310A/B by reconfiguring if required the Tx/Rx wireless circuitry 406 to receive signals from each wireless network 310A/B.) The DSDS wireless device 412 can permit connections with two different wireless networks 310A/B using two different subscriber identities but only one connection at any time.

In a second configuration of a DSDS wireless device 414, a shared set of wireless circuitry 408/410A/B provides for one transmit path and two parallel receive paths that can be used simultaneously. Each wireless cellular protocol software stack 404A/B can be configured to transmit via a set of transmit (Tx) wireless circuitry 408, but only one wireless cellular protocol software stack 404A/B can communicate at any one time via the Tx wireless circuitry 408. Both wireless cellular protocol software stacks 404A/B can receive radio frequency wireless signals via respective receive (Rx) wireless circuitry 410A/B in parallel. The DSDS wireless device 414 can share transmit wireless circuitry 408 between two wireless cellular protocol SW stacks 404A/B, while permitting simultaneous reception via dedicated (and/or configurable) receive wireless circuitry 410A/B. The DSDS wireless device 414 can provide for a connection (e.g., bi-directional data and/or signaling communication) with only one wireless network at a time; however, paging messages (or other control signaling) can be received (e.g., in a downlink direction) from two wireless networks 310A/B at the same time. Similarly, the parallel Rx wireless circuitry 410A/B can provide for reception of broadcast channels, signaling channels, synchronization channels, or other signals from two parallel wireless networks, e.g., for measurements of cells, as part of reselection and/or handover processes, when searching for wireless networks with which to establish connections, to perform downlink (DL) synchronization processes, and/or for associating or registering with wireless networks, etc. The DSDS wireless device 414 can be connected to a first wireless network 310A, e.g., in a voice call, data connection, video call, or other bi-directional connection with the first wireless network 310A, and can receive paging messages from a second wireless network 310B at the same time.

Figure 5:
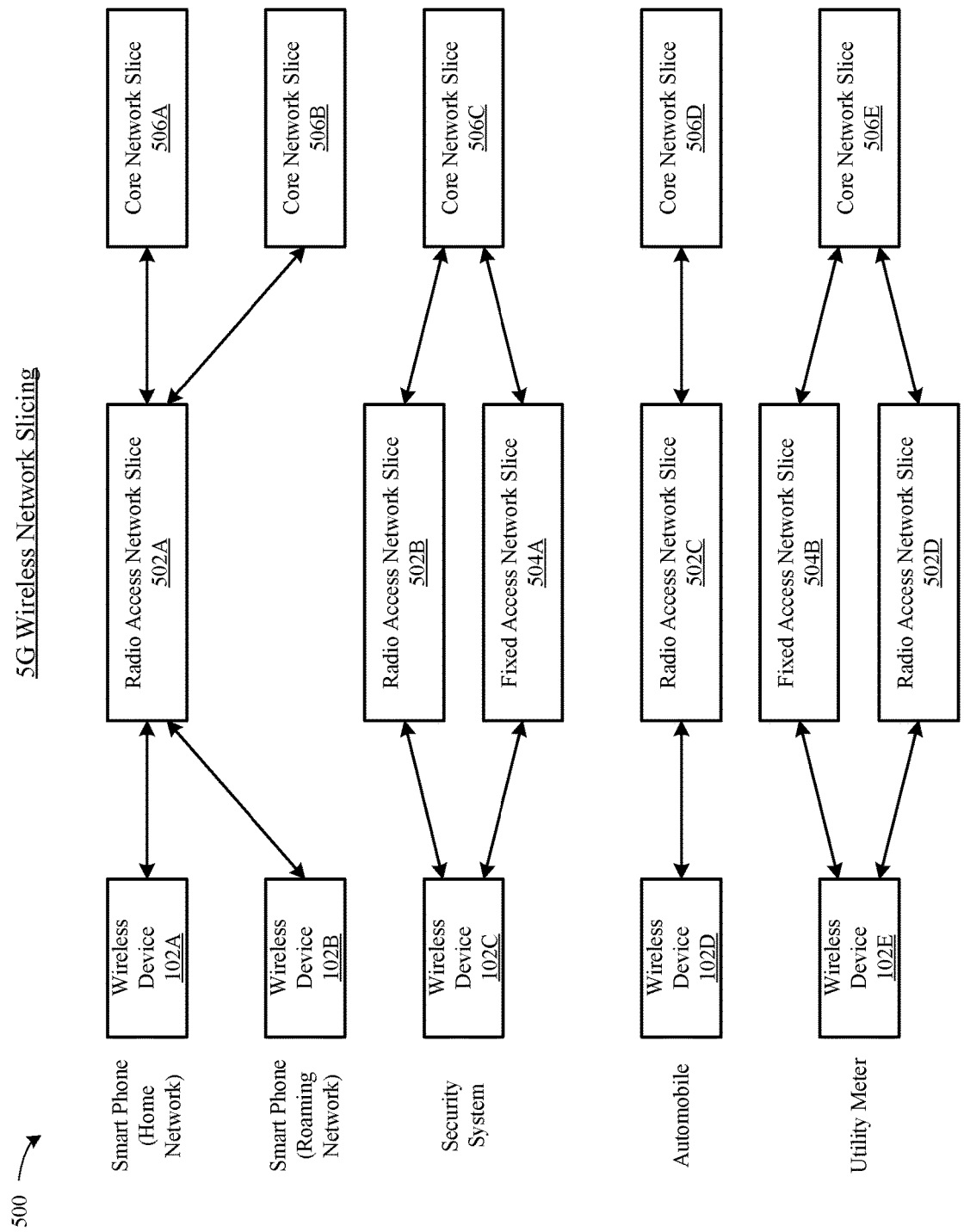
FIG. 5 illustrates a block diagram of an example of 5G wireless network slicing, according to some embodiments.

FIG. 5 illustrates a diagram 500 of an example of network slicing for a 5G wireless network. Network slicing provides for dividing capabilities of a 5G wireless network into parallel virtual networks that each can have different properties to support different wireless devices, different customers, different industries, or the like. Each network slice can be associated with a set of characteristics that can be communicated by the 5G wireless network to wireless devices 102. A wireless device 102 can seek to gain access to a network slice having particular characteristics for use by one or more applications resident on the wireless device 102. A network slice can be considered a virtual (or logical) network that has particular performance and service characteristics. Wireless networks can include i) wireless access networks that use different radio access technologies (RATs) by which wireless devices 102 can establish data connections to the wireless access networks to obtain access to services of the wireless networks and i) core networks that interconnect and transport data as well as manage connections and subscriptions to services. As shown in FIG. 5, different wireless devices 102 can connect to different radio access network slices 502A/B/C/D and/or fixed (e.g., wired)

access network slices 504A/B which then connect to different core network slices 506A/B/C/D/E. A smart phone wireless device 102A can be connected to a radio access network slice 502A and a core network slice 506A associated with an MNO 114 with which a user of the smart phone wireless device 102A has a subscription, e.g., a "home" wireless network. Another smart phone wireless device 102B can connect to the radio access network slice 502B and then to a core network slice 506B, where the core network slice 506A is associated with an MNO 114 with which a user of the smart phone wireless device 102B has a subscription but through a "visited" wireless access network (using the radio access network slice 502A), i.e., via a "roaming" connection. Smart phone wireless devices 102A/B can require different network slice characteristics than additional wireless devices 102C/D/E. For example, a security system wireless device 102C can connect via both a radio access network slice 502B and a fixed access network slice 504A in parallel (or at least be capable of connections to each) to a core network slice 506C to provide a more secure, uninterrupted service. An automobile wireless device 102D can connect to another radio access network slice 502C and to an associated core network slice 506D that each have characteristics suited for use by the automobile wireless device 102D. Similarly, a utility meter wireless device 102E can connect via a fixed access network slice 504B and via a radio access network slice 502D (or at least be capable of connects to each) to a core network slice 506E. Each of the different wireless devices 102A/B/C/D/E illustrated can require network slices that have different characteristics. Network slices best suited for an application on a wireless device 102, however, may not be available via particular cellular wireless credentials (e.g., SIMs or eSIMs 208) and flexibility in the use of different SIMS or eSIMs 208 can be required.

Figure 6:
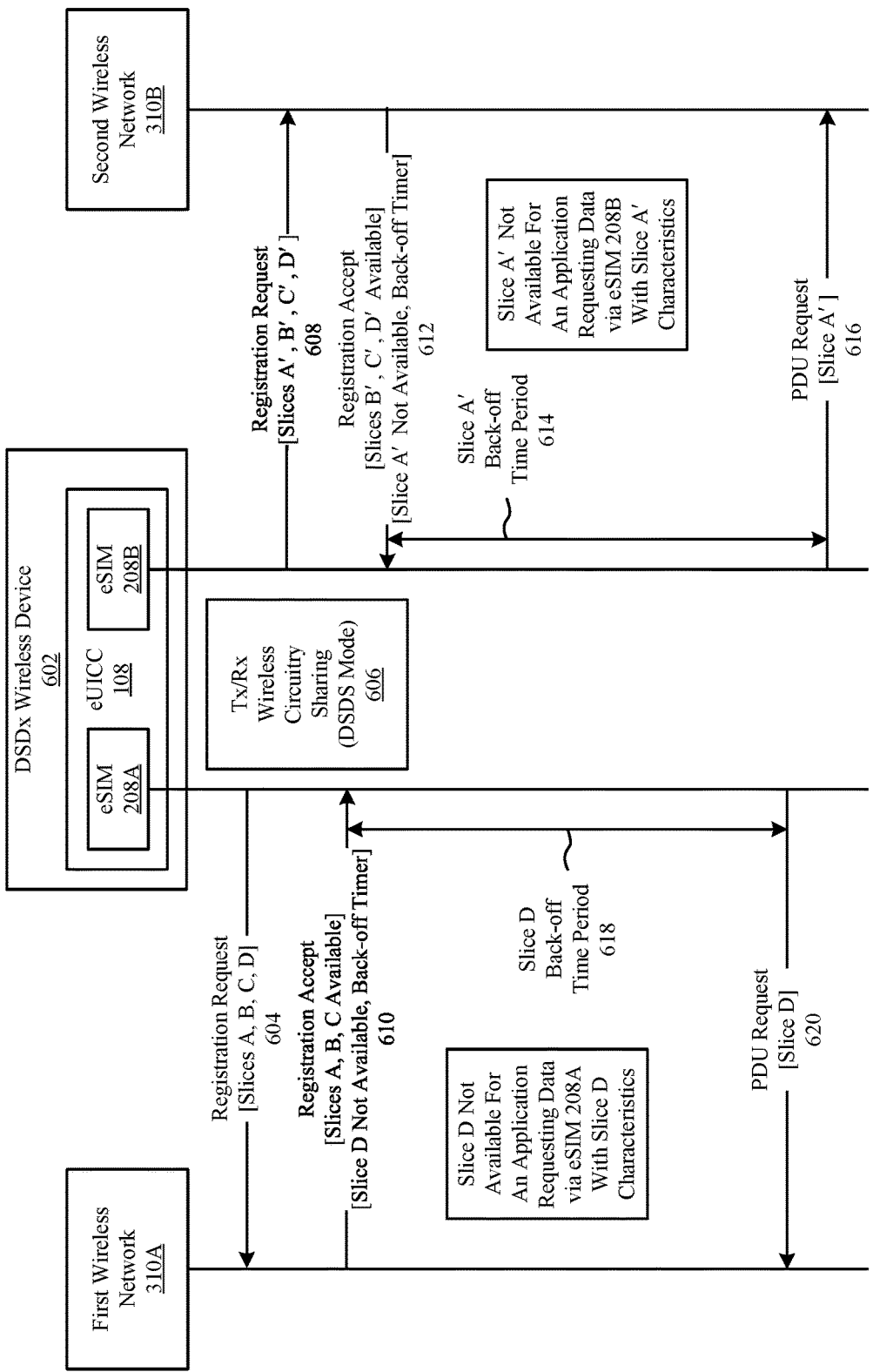
FIG. 6 illustrates a flow chart of an example of network slice availability for a dual SIM wireless device, according to some embodiments.

FIG. 6 illustrates a flow chart 600 of an example of network slice availability for a DSDx wireless device 602. The DSDx wireless device 602 includes on an eUICC 108 a first eSIM 208A to provide access to services of a first wireless network 310A and a second eSIM 208B to provide access to services of a second wireless network 310B. The DSDx wireless device 602 can be configured to share transceiver wireless circuitry and operate in a DSDS mode 606. The DSDx wireless device 602 can send a registration request 604 message to the first wireless network 310A requesting access to network slices A, B, C, and D. The first wireless network 310A can respond to the registration request 604 message with a registration accept 610 message that indicates network slices A, B, and C are available, while network slice D is not available. The registration accept 610 message can include a back-off timer value indicating a network slice D back-off time period 618 following receipt of the registration accept 610 message that the DSDx wireless device 602 should wait before sending an additional request, e.g., PDU request 620 message, for access to the previously rejected network slice D. The DSDx wireless device 602 can also send a registration request 608 message to the second wireless network 310B requesting access to network slices A', B', C', D' (which may be distinct from the network slices A, B, C, D of the first wireless network 310A but have the same type of characteristics, e.g., A~A', B~B', etc.). The second wireless network 310B can respond to the registration request 608 message with a registration accept 612 message that indicates network slices B', C', and D' are available, while network slice A' is not available. The registration accept 612 message can include a back-off timer value indicating a network slice A' back-off time period 614 following receipt of the registration accept 612 message that the DSDx wireless device 602 should wait before sending an additional request, e.g., PDU request 616 message, for access to the previously rejected network slice A'. In the DSDS mode, the DSDx wireless device 602 can be able to establish data connections with only one wireless network at a time, e.g., first wireless network 310A or second wireless network 310B. If an application is initiated that requires (or requests) a data connection having characteristics of network slice D or D', while the DSDx wireless device 602 is connected via eSIM 208A to the first wireless network 310A after rejection of network slice D 610 and before expiration of the network slice D back-off time period 618, the DSDx wireless device 602 can be unable to provide the application-preferred data connection while remaining connected via eSIM 208A to the first wireless network 310A in the DSDS mode, as network slice D' is only available via eSIM 208B associated with the second wireless network 310B. Similarly, if an application is initiated that requires (or requests) a data connection having characteristics of network slice A or A', while the DSDx wireless device 602 is connected via eSIM 208B to the second wireless network 310B after rejection of network slice A' and before expiration of the network slice A' back-off time period 614, the DSDx wireless device 602 can be unable to provide the application-preferred data connection while remaining connected via eSIM 208B to the second wireless network 310B in the DSDS mode, as network slice A is only available via eSIM 208A associated with the first wireless network 310A. Rejection by a wireless network of a requested network slice can occur for different reasons, such as based on a wireless subscription limitation, based on an eSIM 208 profile limitation, based on a capacity limit on the number of simultaneous users via a network slice, etc. As described further herein, the DSDx wireless device 602 can overcome the illustrated limitation, in some embodiments, by switching data connections between eSIMs 208 to gain access to an available network slice or by changing from a DSDS mode to a DSDA mode to allow for parallel access to two wireless networks simultaneously.

Figure 7:
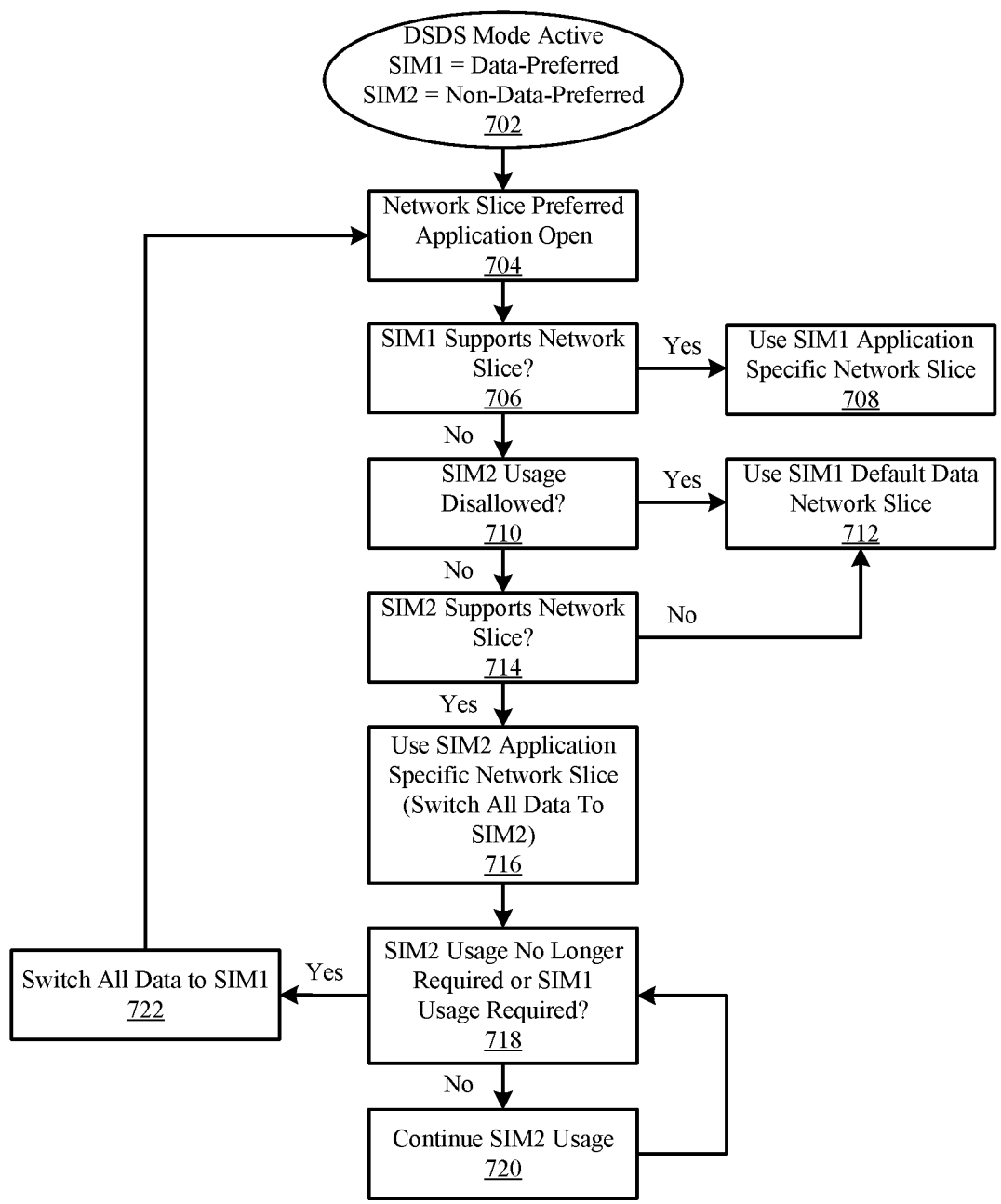
FIG. 7 illustrates a flow chart of an example of adaptive SIM/eSIM profile and network slice selection for a DSDS wireless device, according to some embodiments.

FIG. 7 illustrates a flow chart 700 of an example of adaptive SIM/eSIM profile and network slice selection for a DSDS wireless device 102. At 702, the DSDS wireless device 102 can be configured to support cellular wireless subscriptions via both a first SIM, SIM1, and a second SIM, SIM2, with SIM1 configured as a data-preferred SIM for data connections and SIM2 configured as a non-data-preferred SIM. (Note that the use of the term SIM is not intended as a limitation, and the same actions described herein for two different SIMS can also be applied to two different eSIMs 208 or to an eSIM 208 and a SIM as well.) At 704, the DSDS wireless device 102 determines that an application is initiated (or already open) that prefers a network slice having particular properties to use for data connections by the application. At 706, the DSDS wireless device 102 determines whether a first wireless network associated with SIM1 supports the network slice preferred by the application. When the first wireless network associated with SIM1 supports the network slice preferred by the application, the DSDS wireless device 102 can request a protocol data unit (PDU) data connection (or re-use an existing PDU data connection) via the application-preferred network slice via SIM1. When the first wireless network associated with SIM1 does not support the network slice preferred by the application, the DSDS wireless device 102 determines whether use of the SIM2 is disallowed. The use of SIM2 can be disallowed when: i) a cellular voice connection via SIM1 is ongoing and the cellular voice connection and an alternate non-cellular voice connection, e.g., via voice over Wi-Fi, is not available, ii) there exists ongoing data activity via SIM1 or pending requests for PDU data connections to support services that require use of SIM1, iii) higher priority services via SIM1, such as emergency services or public warning system (PWS) services. When SIM1 cannot provide the application-preferred network slice and SIM2 is not available, the DSDS wireless device 102, at 712, can use a default data network slice via SIM1 for the application. In some embodiments, the DSDS wireless device 102 can provide a notification to a user, e.g., a pop-up message, indicating or requesting use of the default (non-preferred) data network slice via SIM1 for the application. In some embodiments, the notification can indicate that the application may behave unexpectedly when used via a default (non-preferred) data network slice. At 714, the DSDS wireless device 102 determines whether a second wireless network associated with SIM2 supports the network slice preferred by the application. When the second wireless network associated with SIM2 does not support the network slice preferred by the application, the DSDS wireless device 102, at 712, can use a default data network slice via SIM1 for the application or provide a notification to a user of the DSDS wireless device 102. When the second wireless network associated with SIM2 supports the network slice preferred by the application, the DSDS wireless device 102, at 716, can request a PDU data connection via the application-preferred network slice via SIM2. In some embodiments, the DSDS wireless device 102 initiates a new registration with the second wireless network associated with SIM2 to determine and/or secure availability of the application-preferred network slice. The DSDS wireless device 102, at 716, also switches existing data connections from the first wireless network via SIM1 to the second wireless network via SIM2. In some embodiments, switching data connections from the first wireless network via SIM1 to the second wireless network via SIM2 can depend on a user configurable setting indicating that switching data connections between different cellular wireless networks is allowed. In some embodiments, when a user configurable setting indicates that switching data connections between cellular wireless network is not allowed, a notification message can be provided to the user to request permission to switch the data connections, to change the user settings for data switching, and/or that a preferred data connection for the application cannot be provided. In some embodiments, the notification can indicate that the user may incur a monetary charge for use of the application-preferred network slice via the non-data-preferred SIM2. After establishing the PDU data connection via the application-preferred network slice via SIM2, the DSDS wireless device 102, at 718, can determine whether use of the second wireless network via SIM2 is no longer required or whether use of the first wireless network via SIM1 is required. Use of data connections with the second wireless network via SIM2 can continue until one or more exit criteria are satisfied. Example exit criteria to return from the second wireless network via SIM2 to the first wireless network via SIM1 include: i) the application that required use of the application-preferred network slice via SIM2 is no longer in use, ii) notification of an incoming voice connection from the first wireless network via SIM1 and a voice over Wi-Fi connection is unavailable for the incoming voice connection, iii) a higher priority request for a PDU data connection for the first wireless network via SIM1 is required, iv) notification of an emergency services message or public warning system (PWS) message from the first wireless network via SIM1, v) performance for the application-preferred data connection with the second wireless network. via SIM2 does not satisfy a performance threshold, or vi) the application-preferred network slice becomes available from the first wireless network via SIM1. When continued use of the second wireless network via SIM2 is required and use of the first wireless network via SIM1 is not required, the DSDS wireless device 102, at 720, can continue to use data connections with the second wireless network via SIM2. When continued use of the second wireless network via SIM2 is no longer required or use of the first wireless network via SIM1 is required, the DSDS wireless device 102, at 722, can switch all existing data connections back to the first wireless network via SIM1. In some embodiments, the DSDS wireless device 102 can periodically check whether the application-preferred network slice is available from the first wireless network via the data-preferred SIM1 while using an application-preferred network slice from the second wireless network via the non-data-preferred SIM2. Checking for availability of the application-preferred network slice from the first wireless network via SIM1 can occur as a result of expiration of a back-off timer started based on a previous request or when a registration area for the DSDS wireless device 102 changes.

The flow chart 700 of FIG. 7 illustrates a DSDS wireless device 102 switching data connections between a data-preferred SIM, SIM1, and a non-data-preferred SIM, SIM2, under certain conditions to gain access to an application-preferred network slice. When the application-preferred network slice is unavailable via the data-preferred SIM, SIM1, but available via the non-data-preferred SIM, SIM2, established data connections can be switched from SIM1 to SIM2 and a new data connection via the application-preferred network slice for the application can be established via SIM2. In cases where a user of the DSDS wireless device 102 has not previously indicated that data switching between SIMS is allowed, a notification can be provided to allow a user to permit switching between SIMS or to select a particular SIM to use for the application. While using data connections via the non-data-preferred SIM, SIM2, data connections can be switched back to the preferred SIM, SIM1, i) when the application that requested the application-preferred network slice is no longer in use, ii) after a period of data inactivity indicating use of the application-preferred network slice is no longer required, iii) when use of SIM1 is required for a mobile-originated or mobile-terminated voice connection, or iv) when a high priority service requires use of SIM1, such as a high priority multimedia message service (MMS), an emergency service message, a public warning system (PWS) message, or the like. In some cases, when SIM1 can use an Internet Protocol (IP) Multimedia Subsystem (IMS) service over a non-3GPP non-cellular wireless connection, e.g., IMS over non-3GPP, or voice over Wi-Fi, and use of the SIM2 data connection for the application is still required, SIM1 data for a non-3GPP non-cellular wireless connection can be transported via SIM2 data connections.

Figure 8:
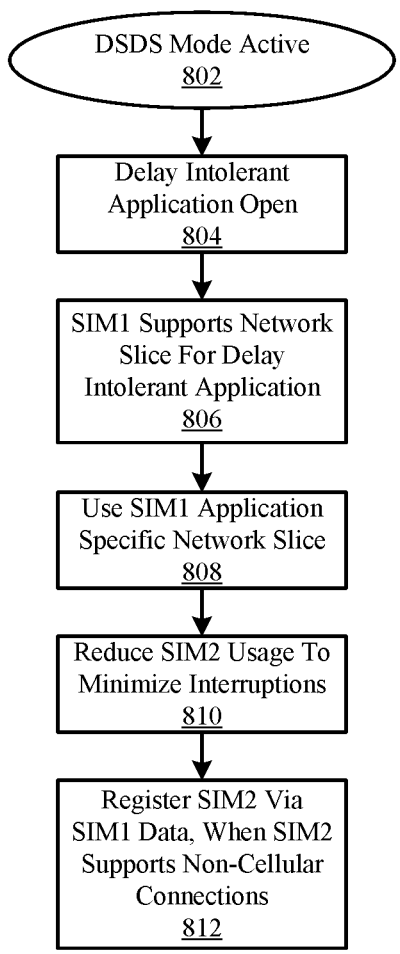
FIG. 8 illustrates a flow chart of an example of dynamic configuration of a DSDS wireless device to support a delay intolerant application, according to some embodiments.

FIG. 8 illustrates a flow chart 800 of an example of dynamically configuring a DSDS wireless device 102 to support a delay intolerant application. At 802, the wireless device 102 can be configured in a DSDS mode. At 804, an application on the wireless device 102 is initiated that requires (or requests) access to a network slice having properties that support minimal interruption of the application while in use. For example, the application cannot tolerate data transmission latency delays, while using a first SIM, because of interruptions caused by use of a second SIM. At 806, the wireless device 102 determines that a first wireless network associated with a first SIM, SIM1, supports the application-preferred network slice for the delay intolerant application. At 808, access to the application-preferred network slice of the first wireless network via SIM1 is established and used for the delay intolerant application. While the delay intolerant application is in use via the application-preferred network slice, at 810, usage of a second SIM, SIM2, of the wireless device 102 can be reduced to minimize interruptions of the data connection for the delay intolerant application. In some embodiments, page monitoring of SIM2 is reduced to a minimum acceptable level, e.g., as based on minimal requirements for page monitoring obtained from a second wireless network associated with SIM2. In some embodiments, SIM2 is disabled for normal service usage, e.g., incoming or outgoing voice connections and/or short message service (SMS) messages via SIM2 are ignored, but use of SIM2 for emergency services, public warning system (PWS) messages, or other high (or highest) priority services is allowed. In some embodiments, when continuous use of the delay intolerant application via SIM1 surpasses a time threshold, SIM2 can be placed into a limited service state. At 812, when a voice over Wi-Fi or other non-3GPP non-cellular access registration is available for SIM2, the wireless device 102 can register for access to cellular services of SIM2 via a cellular data connection provided by SIM1.

Figure 9:
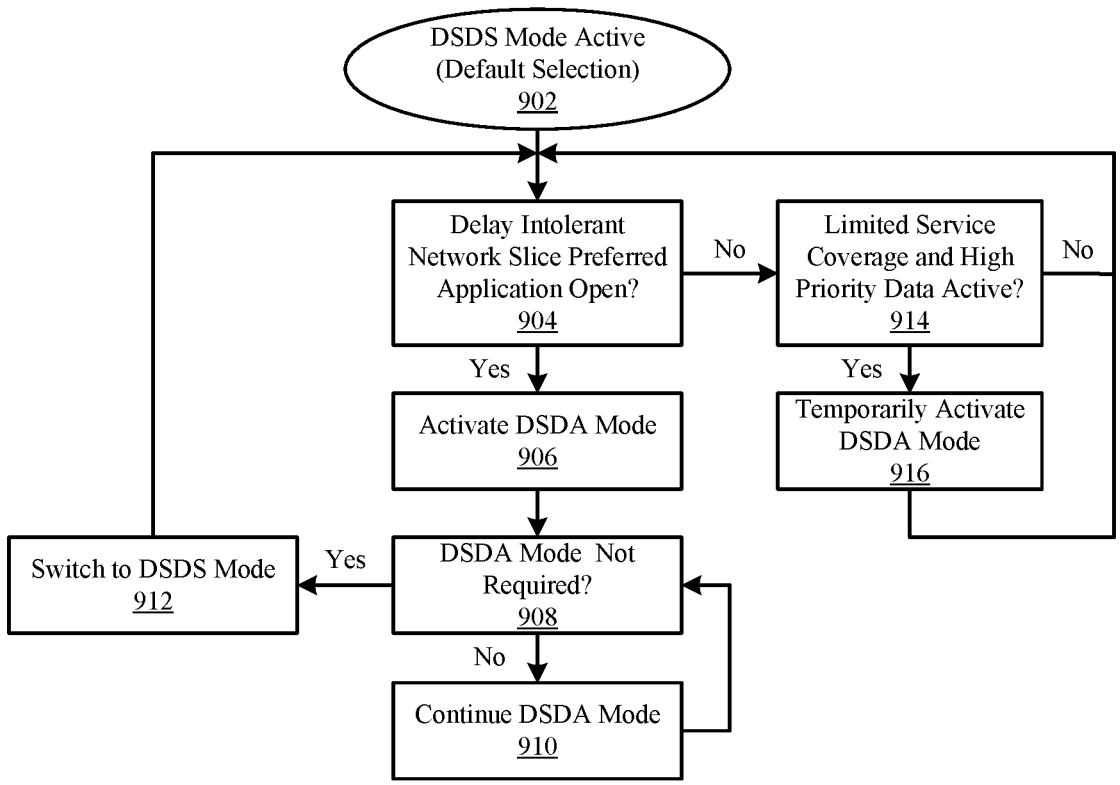
FIG. 9 illustrates a flowchart of an example of adaptive mode selection for a dual SIM wireless device, according to some embodiments.

FIG. 9 illustrates a flow chart 900 of an example of adaptive mode selection for a DSDx wireless device 102. The DSDx wireless device 102 can be configured in a DSDS mode, in which a first transceiver is in an active state and a second transceiver is in a power reduced, inactive state, or in a DSDA mode, in which both the first and second transceivers are in the active state. The DSDx wireless device 102 can include multiple SIMs and/or eSIMs 208. For clarity, the following discussion assumes the DSDx wireless device 102 includes a first SIM and a second SIM; however, the same description applies to a DSDx wireless device 102 that includes a first eSIM 208 and a second eSIM 208, a first SIM and a first eSIM 208, or any other combination of SIMS and eSIMs 208, i.e., a multi-SIM/eSIM DSDx wireless device 102. The DSDx wireless device 102 includes a delay-intolerant application that requires a network slice having particular properties, e.g., high quality of service (QoS) performance values with low delay, low error rate, high throughput, and guaranteed connectivity (minimal to no interruptions permitted). At 902, the DSDx wireless device 102 can be configured initially in a DSDS mode, which can be a default configuration for the DSDx wireless device 102 to reduce power consumption, in some embodiments. At 904, the DSDx wireless device 102 can determine whether the delay-intolerant application is initiated (or continues to be in use). When the delay-intolerant application is not in use, at 914, the DSDx wireless device 102 determines whether the DSDx wireless device 102 i) is operating in a region of limited service coverage for a first SIM, such as at the edge of a cellular network cell's coverage area with a weak signal strength below a signal strength threshold and/or a weak signal quality below a signal quality threshold, and ii) one or more high priority data connections are active via a second SIM. There can be no active data connections via the first SIM; however, the DSDx wireless device 102 can perform background scanning and network measurements (by temporarily switching the operable transceiver in the DSDS mode from a first wireless network associated with the first SIM to a second wireless network associated with the second SIM). As the background scanning and/or network measurements can increase in frequency and/or duration in areas of weak cell coverage, to reduce interruptions for the high priority data connection via the second SIM, the DSDx wireless device 102, at 916, can enable the DSDA mode temporarily, to perform periodic background searches for the first SIM, using a first transceiver in parallel with high priority data communication for the second SIM using a second transceiver, and subsequently return to the DSDS mode having only one transceiver active. When the delay-intolerant application is initiated or in use, as determined at 904, the DSDx wireless device 102 can enable the DSDA mode with both transceivers active and establish a PDU connection (or use an existing PDU connection) via an application-preferred network slice having the properties required by the delay-intolerant application via the first SIM or the second SIM (depending on from which SIM the application-preferred network slice is available). Using the DSDA mode, the delay-intolerant application can use a data connection via a first transceiver while performing page monitoring or other network functions that could interrupt the data connection via a second transceiver. At 908, the DSDx wireless device 102 determines whether the DSDA mode is no longer required to be used. Exemplary criteria for exiting the DSDA mode and returning to the DSDS mode can include: i) the delay-intolerant application is no longer in use, ii) a data inactivity time-out occurs, iii) the DSDx wireless device 102 reselects from a 5G radio access technology (RAT) to a non-5G RAT, iv) a display required for use of the delay-intolerant application is off, and/or v) reception of an input indicating directly or indirectly that the DSDA mode is no longer required, e.g., placing a user placing the DSDx wireless device 102 in a power-reduced state. When the DSDA mode is required, at 910, the DSDx wireless device 102 continues to operate in the DSDA mode. When the DSDA mode is no longer required, at 912, the DSDx wireless device 102 switches back to the DSDS mode. In some embodiments, when a non-3GPP non-cellular wireless connection is available having required properties to support the application-preferred network slice or for high priority data, the DSDx wireless device 102 can remain in the DSDS mode (instead of using a DSDA mode) and use the non-3GPP non-cellular wireless connection for the delay-intolerant application data communication or for the high priority data communication. When the 3GPP non-cellular wireless connection is not available, does not support the application-preferred network slice, or does not have the properties required for the high priority data, the DSDx wireless device 102 can use the DSDA mode.

Figure 10:
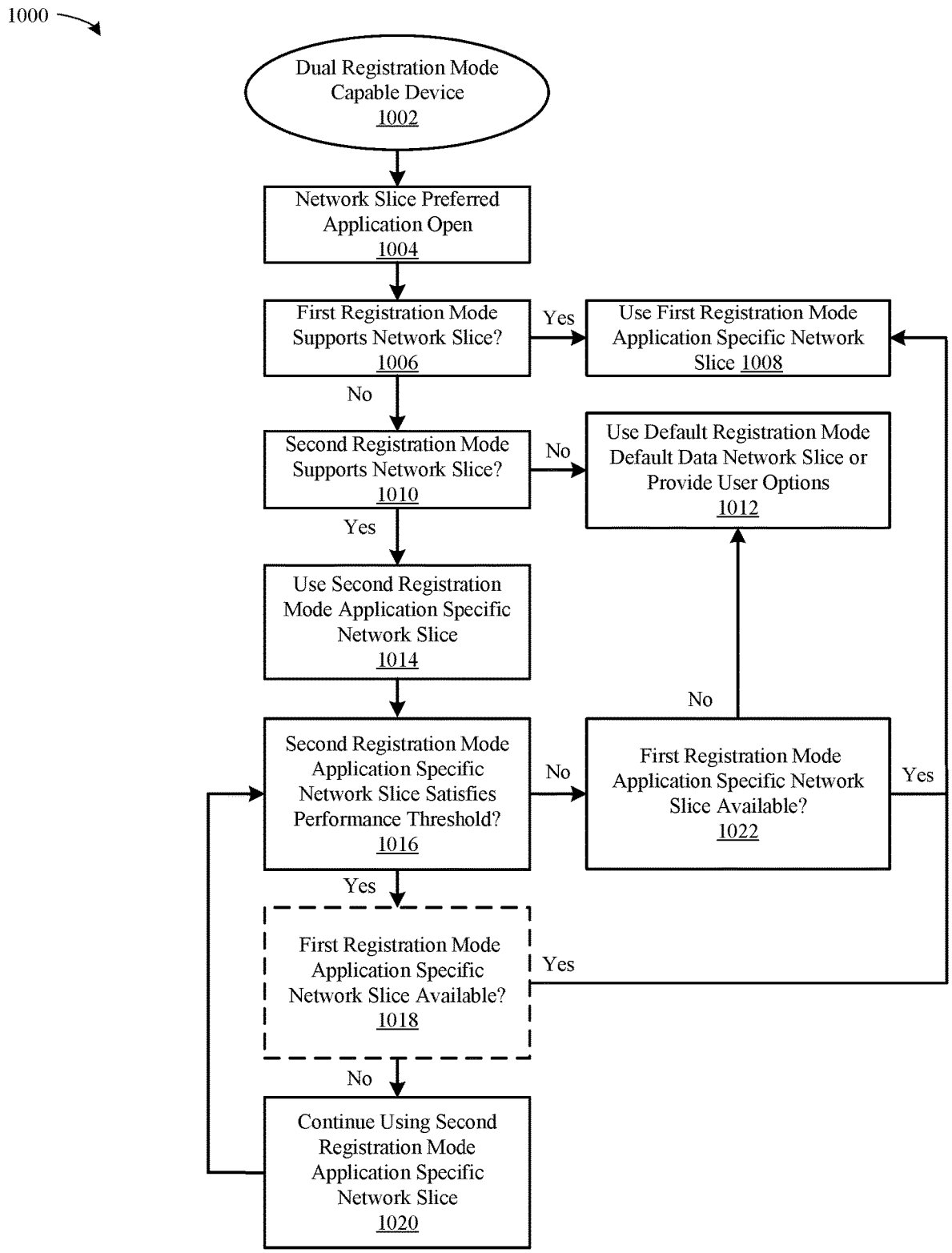
FIG. 10 illustrates a flow chart of an example of adaptive registration mode and network slice selection for a dual registration mode capable wireless device, according to some embodiments.

FIG. 10 illustrates a flow chart 1000 of an example of adaptive registration mode and network slice selection for a wireless device 102 capable of operating with dual (or multiple) registrations. When multiple registration modes associated with distinct wireless access networks are available, the wireless device 102 can switch use of registration modes, and transfer data connections to application-preferred network slices based on availability via wireless access networks associated with the various registration modes. If an application-preferred network slice is available only via a particular wireless access network, the wireless device 102 can establish (or switch) a PDU connection for the application by using the applicable registration mode associated with the particular wireless access network. When the application-preferred network slice is available via two (or more generally, multiple) different wireless access networks associated with two (or multiple) registration modes, the wireless device 102 can establish (or switch)

a PDU connection for the application between the different wireless access networks (switching between registration modes) based on performance metrics and/or prioritization for use of different registration modes.

At 1002, the wireless device 102 is configured or configurable to operate in a dual registration mode, with two different registrations available to the wireless device 102, e.g., registration via a 3GPP cellular wireless access network and registration via a non-3GPP non-cellular wireless access network. In some embodiments, the two different registrations can be with the same SIM or eSIM 208. In some embodiments, the two different registrations can be with distinct SIMS and/or eSIMs 208. At 1004, the wireless device 102 determines that an application is initiated (or already in use) that prefers a network slice having particular characteristics for data communication. At 1006, the wireless device 102 determines whether a first registration mode associated with a first wireless access network supports the application-preferred network slice. When the first registration mode supports the application-preferred network slice, at 1008, the wireless device 102 establishes a PDU data connection (or uses an existing PDU data connection) via the application-preferred network slice through the first wireless access network associated with the first registration mode for data communication of the application. When the first registration mode does not support the application-preferred network slice, at 1010, the wireless device 102 determines whether a second registration mode associated with a second wireless access network supports the application-preferred network slice. An access network associated with a registration mode and/or an associated core network may be unable to provide the application-preferred network slice, e.g., a network slice having the properties required i) is not instantiated or ii) is instantiated but has no existing capacity at the time that the wireless device 102 registers (which can be determined based on information stored at the wireless device 102 regarding availability of network slices via a particular registration mode). If the wireless device 102 has not previously registered via a registration mode, the wireless device 102 can send a registration request message and receive a response to determine whether the application-preferred network slice is supported via the registration mode. When the application-preferred network slice is not supported by the first registration mode or the second registration mode, the wireless device 102, at 1012, can establish a PDU data connection (or use an existing PDU data connection) via a default data network slice of a default registration mode. In some embodiments, the wireless device 102, at 1012, can additionally or alternatively provide a notification to a user of the wireless device 102 indicating use of the default registration mode default network slice or provide additional user options for selecting a registration mode and/or network slice for use by the application. When the first registration mode does not support the application-preferred network slice and the second registration mode does support the application preferred network slice, the wireless device 102, at 1014, can establish a PDU data connection (or use an existing PDU data connection) via the application-preferred network slice through the second wireless access network associated with the second registration mode for data communication of the application. At 1016, the wireless device 102 can determine whether one or more performance metrics for data communication over the application-preferred network slice via the second registration mode satisfies (or does not satisfy, e.g., falls below) a performance threshold. While using the application-preferred network slice via the second registration mode, the wireless device 102, at 1018, can determine whether an application-preferred network slice has become available via the first registration mode, particularly when the first registration mode is a preferred registration mode. When the performance threshold is satisfied, and the application-preferred network slice via the first registration mode is not available, at 1020, the wireless device 102 continues to use the application-preferred network slice via the second registration mode. In some embodiments, the wireless device 102, at 1018, determines that the application-preferred network slice is available via the first registration mode, and switches the data connection for the application from the second registration mode to the first registration mode to use for the application at 1008. When performance via the application-preferred network slice via the second registration mode does not satisfy the performance threshold as determined at 1016, e.g., multiple data stalls are observed, the wireless device 102, at 1022, can determine whether the application-preferred network slice is available via the first registration mode and switch to using the first registration mode at 1008 when the application-preferred network slice is available via the first registration mode. When performance via the application-preferred network slice via the second registration mode does not satisfy the performance threshold, as determined at 1016, and the application-preferred network slice remains unavailable via the first registration mode, a determined at 1022, the wireless device 102 can switch to using a default data network slice via a default registration mode, at 1012, or provide additional user options for selecting a network slice for the application. In some embodiments, when the application is no longer in use, e.g., the user closes the application or an inactivity timeout occurs, the wireless device 102 can switch to using a default registration mode.

Figure 11:
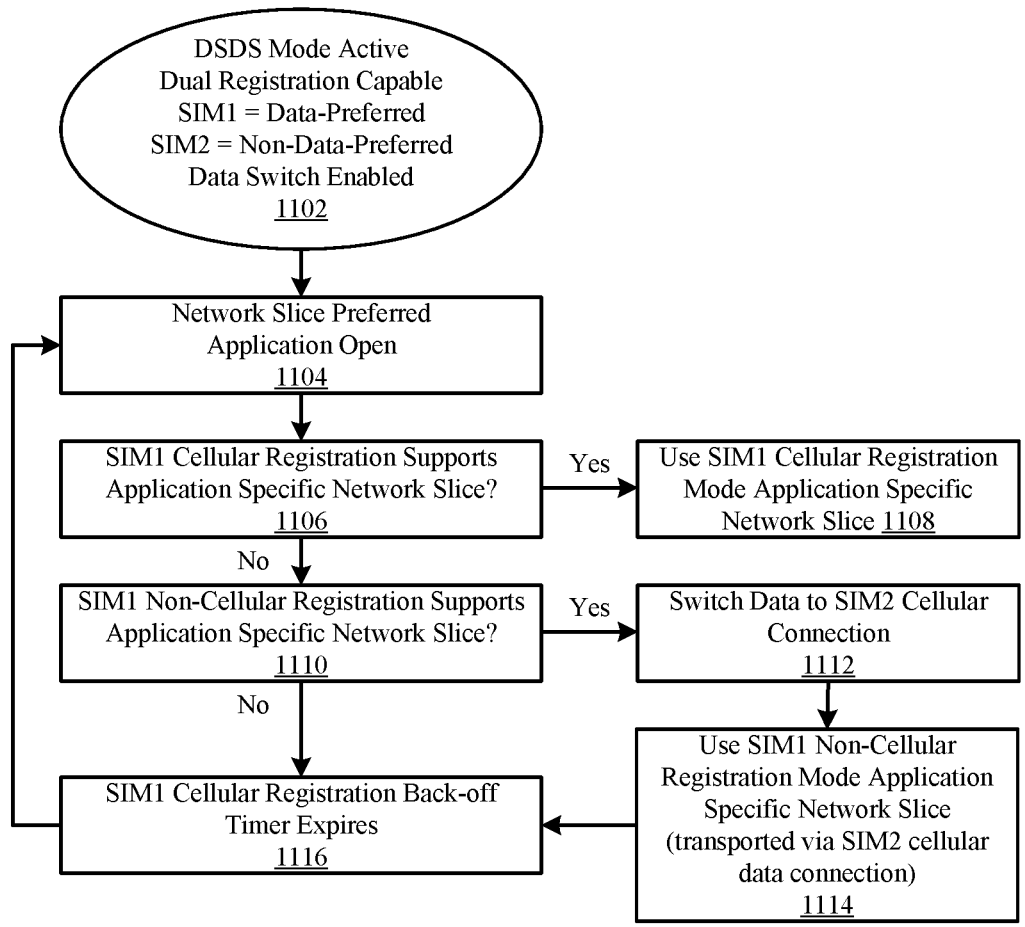
FIG. 11 illustrates a flow chart of an example of adaptive registration mode and network slice selection for a DSDS wireless device, according to some embodiments.

FIG. 11 illustrates a flow chart 1100 of an example of adaptive registration mode and network slice selection for a DSDS wireless device 102. An application-preferred network slice can be unavailable via a first wireless access network, e.g., a 3GPP cellular wireless access network, associated with a first SIM, but can be available via a second wireless access network, e.g., a non-3GPP non-cellular wireless access network associated with the first SIM. The DSDS wireless device 102 can use stored information, e.g., based on user equipment (UE) route selection policy (URSP) rules, to determine availability of an application-preferred network slice. In some cases, the application-preferred network slice is not available based on a message received from the first wireless access network in response to a registration request message or to a PDU establishment request. In some embodiments, when switching data connections between two different SIMS (or between two different eSIMs 208, or between a SIM and an eSIM 208) of the DSDS wireless device 102, the DSDS wireless device 102 can switch data connections from the first SIM to the second SIM and register for access to non-3GPP non-cellular wireless access connections of the first SIM using data connections of the second SIM. In some embodiments, the DSDS wireless device 102 transports data for an application via an application-preferred network slice provided via a second wireless access network, e.g., a non-3GPP non-cellular wireless access network, associated with the first SIM, using a cellular data connection to a cellular wireless access network associated with the second SIM. The cellular data of the second SIM provides data transport for the non-cellular data of the first SIM. When the application-preferred network slice is no longer required, e.g., an application using the application preferred network slice closes or an inactivity timeout occurs, the DSDS wireless device 102 can switch data connections back to the first SIM, where the first SIM is configured by the user as a data-preferred SIM. In some embodiments, when access to the application-preferred network slice via the first access network of the first SIM is denied and a back-off timer value is obtained, the DSDS wireless device 102, after switching data to the second SIM, can switch back to the first SIM, after expiration of the back-off timer, to re-check whether the application-preferred network slice via the first wireless access network of the first SIM has become available.

At 1102, the DSDS wireless device 102 is configured with a first SIM, SIM1, as a data-preferred SIM to be used preferably for data connections, and a second SIM, SIM2, as a non-data-preferred SIM only to be used for data connections under certain circumstances. Data switching between SIM1 and SIM2 can be allowed based on a user configuration of the DSDS wireless device 102. At 1104, the DSDS wireless device 102 determines that an application that requires an application-preferred network slice is opened (or already open). At 1106, the DSDS wireless device 102 determines whether registration via a cellular wireless access network of SIM1 supports the application-preferred network slice. When the cellular wireless access network of SIM1 supports the application-preferred network slice, the DSDS wireless device 102, at 1108, can establish a data PDU connection (or re-use an existing data PDU connection) via the application-preferred network slice over the cellular wireless access network of SIM1. When the cellular wireless access network of SIM1 does not support the application-preferred network slice, the DSDS wireless device 102, at 1110, determines whether the non-cellular wireless access network of SIM1 supports the application-preferred network slice. When the non-cellular wireless access network of SIM1 supports the application-preferred network slice, and cellular data switching between SIM1 and SIM2 is allowed, the DSDS wireless device 102, at 1112, switches data from SIM1 cellular data connections to SIM2 cellular data connections. Subsequently, at 1114, the DSDS wireless device 102 registers with the non-cellular wireless network of SIM1 to gain access to the application-preferred network slice, with data for the application transported via a SIM2 cellular data connection. When both the cellular and non-cellular wireless access networks of SIM1 do not support the application-preferred network slice, the DSDS wireless device 102 can wait until a back-off timer associated with the cellular wireless access network of SIM1 expires, at 1116, and return to determining whether the application-preferred network slice is still required at 1104.

Figure 12A:
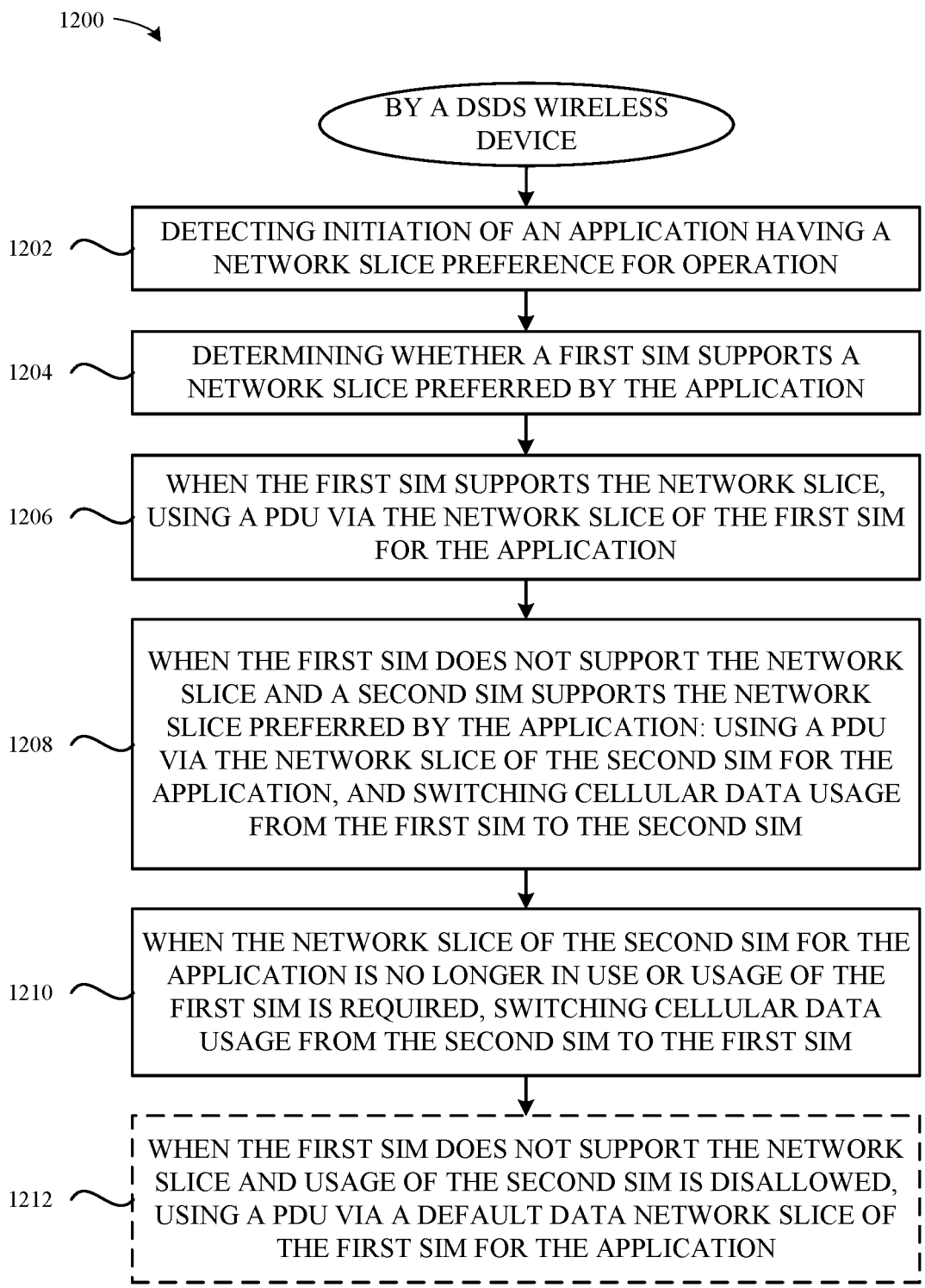
FIG. 12A illustrates a flow chart of an exemplary method for adaptive SIM/eSIM profile and network slice selection performed by a DSDS wireless device, according to some embodiments.

FIG. 12A illustrates a flow chart 1200 of an exemplary method for adaptive SIM/eSIM profile and network slice selection performed by a DSDS wireless device 102. The DSDS wireless device 102 can be configured with a first SIM (or eSIM 208) as a data-preferred SIM (or eSIM) and a second SIM (or eSIM 208) as a non-data-preferred SIM (or eSIM 208). For clarity, the remainder of the discussion for FIG. 12A denotes first and second SIMS, but the same logic applies for multiple eSIMs 208, or combinations of SIMs and eSIMs 208 on a DSDS wireless device 102. At 1202, the DSDS wireless device 102 detects initiation of an application having a network slice preference for operation. At 1204, the DSDS wireless device 102 determines whether the first SIM supports a network slice preferred by the application. At 1206, when the first SIM supports the network slice preferred by the application, the DSDS wireless device 102 uses a protocol data unit (PDU) data connection via the network slice of the first SIM for the application. At 1208, when the first SIM does not support the network slice preferred by the application and the second SIM supports the network slice preferred by the application, the DSDS wireless device 102 i) uses a PDU data connection via the network slice of the second SIM for the application, and ii) switches cellular data usage from the first SIM to the second SIM. At 1210, when the network slice of the second SIM for the application is no longer in use or usage of the first SIM is required, the DSDS wireless device 102 switches cellular data usage back from the second SIM to the first SIM. In some embodiments, at 1212, when the first SIM does not support the network slice preferred by the application and usage of the second SIM is disallowed, the DSDS wireless device 102 establishes and uses a PDU data connection via a default data network slice of the first SIM for the application.

In some embodiments, the network slice of the second SIM for the application is no longer required when use of the application ends. In some embodiments, usage of the first SIM is required when an incoming connection request via the first SIM is detected and a non-cellular connection for the incoming connection request is unavailable. In some embodiments, usage of the first SIM is required when a high priority message request via the first SIM is detected. In some embodiments, the high priority message request includes an emergency services or public warning system (PWS) message. In some embodiments, the method performed by the DSDS wireless device 102 further includes: i) determining the first SIM supports the network slice for the application while using the PDU via the network slice of the second SIM, ii) using a PDU via the network slice of the first SIM for the application, and iii) switching cellular data usage from the second SIM back to the first SIM. In some embodiments, the method performed by the DSDS wireless device 102 further includes: i) determining the network slice of the second SIM for the application is no longer available while using the PDU via the network slice of the second SIM, and ii) switching cellular data usage including for the application from the second SIM back to the first SIM. In some embodiments, when the application having the network slice preference for operation requires minimal interruption, the DSDS wireless device 102 reduces activity of one or more SIMS of the DSDS wireless device 102 that are not being used for the application. In some embodiments, reducing activity of one or more SIMS includes reducing page monitoring for the one or more SIMS to a minimum allowed threshold. In some embodiments, reducing activity of one or more SIMs includes diverting incoming connection requests to voice mail for the one or more SIMS. In some embodiments, reducing activity of one or more SIMs includes disabling alerts for short message system (SMS) alerts for the one or more SIMS while allowing alerts for emergency services and public warning system (PWS) messages. In some embodiments, PDU data connections via network slices of the first SIM and/or via network slices of the second SIM are established and used based on availability of the network slices and suitability of the network slices to support preferences of one or more active (and/or initiating) applications of the DSDS wireless device 102.

Figure 12B:
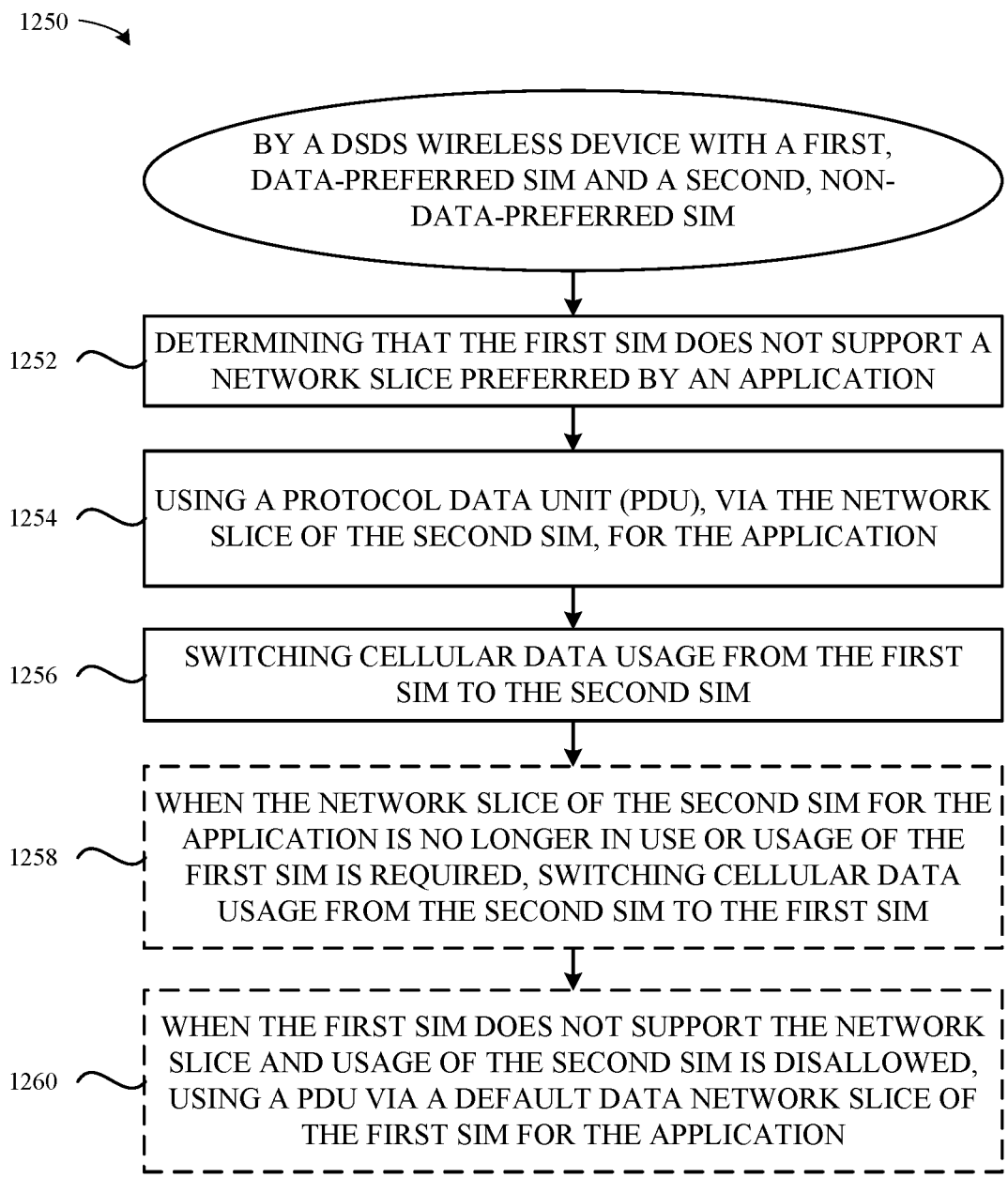
FIG. 12B illustrates a flow chart of another exemplary method for adaptive SIM/eSIM profile and network slice selection performed by a DSDS wireless device, according to some embodiments.

FIG. 12B illustrates a flow chart 1250 of another exemplary method for adaptive SIM/eSIM profile and network slice selection performed by a DSDS wireless device 102. The DSDS wireless device 102 is configured with a first SIM (or eSIM 208) as a data-preferred SIM (or eSIM) and a second SIM (or eSIM 208) as a non-data-preferred SIM (or eSIM 208). For clarity, the remainder of the discussion for FIG. 12B denotes first and second SIMS, but the same logic applies for multiple eSIMs 208, or combinations of SIMS and eSIMs 208 on a DSDS wireless device 102. At 1252, the DSDS wireless device 102 determines that the first SIM does not support a network slice preferred by an application. At 1254, the DSDS wireless device 102 uses a PDU data connection via the network slice of the second SIM for the application. At 1256, the DSDS wireless device 102 switches cellular data usage from the first SIM to the second SIM. In some embodiments, at 1258, when the network slice of the second SIM for the application is no longer in use or usage of the first SIM is required, the DSDS wireless device 102 switches cellular data usage back from the second SIM to the first SIM. In some embodiments, at 1260, when the first SIM does not support the network slice preferred by the application and usage of the second SIM is disallowed, the DSDS wireless device 102 uses a PDU data connection via a default data network slice of the first SIM for the application.

In some embodiments, when the network slice of the second SIM for the application is no longer in use or usage of the first SIM is required, the DSDS wireless device 102 switches cellular data usage from the second SIM to the first SIM. In some embodiments, the network slice of the second SIM for the application is no longer in use when use of the application ends. In some embodiments, usage of the first SIM is required when an incoming connection request via the first SIM is detected and a non-cellular connection for the incoming connection request is unavailable. In some embodiments, usage of the first SIM is required when a high priority message request via the first SIM is detected. In some embodiments, the high priority message request includes an emergency services or public warning system (PWS) message. In some embodiments, when the first SIM does not support the network slice and usage of the second SIM is disallowed, the DSDS wireless device 102 establishes and uses a PDU via a default data network slice of the first SIM for the application. In some embodiments, the method performed by the DSDS wireless device 102 further includes: i) determining the first SIM supports the network slice for the application while using the PDU via the network slice of the second SIM, ii) using the PDU via the network slice of the first SIM for the application, and iii) switching cellular data usage from the second SIM back to the first SIM. In some embodiments, the method performed by the DSDS wireless device 102 further includes: i) determining the network slice of the second SIM for the application is no longer available while using the PDU via the network slice of the second SIM, and ii) switching cellular data usage including for the application from the second SIM back to the first SIM. In some embodiments, when the application having the network slice preference for operation requires minimal interruption, the DSDS wireless device 102 reduces activity of one or more SIMS of the DSDS wireless device 102 that are not being used for the application. In some embodiments, reducing activity of one or more SIMS includes reducing page monitoring for the one or more SIMS to a minimum allowed threshold. In some embodiments, reducing activity of one or more SIMs includes diverting incoming connection requests to voice mail for the one or more SIMS. In some embodiments, reducing activity of one or more SIMs includes disabling alerts for short message system (SMS) alerts for the one or more SIMs while allowing alerts for emergency services and public warning system (PWS) messages. In some embodiments, PDU data connections via network slices of the first SIM and/or via network slices of the second SIM are established and used based on availability of the network slices and suitability of the network slices to support preferences of one or more active (and/or initiating) applications of the DSDS wireless device 102.

Figure 13:
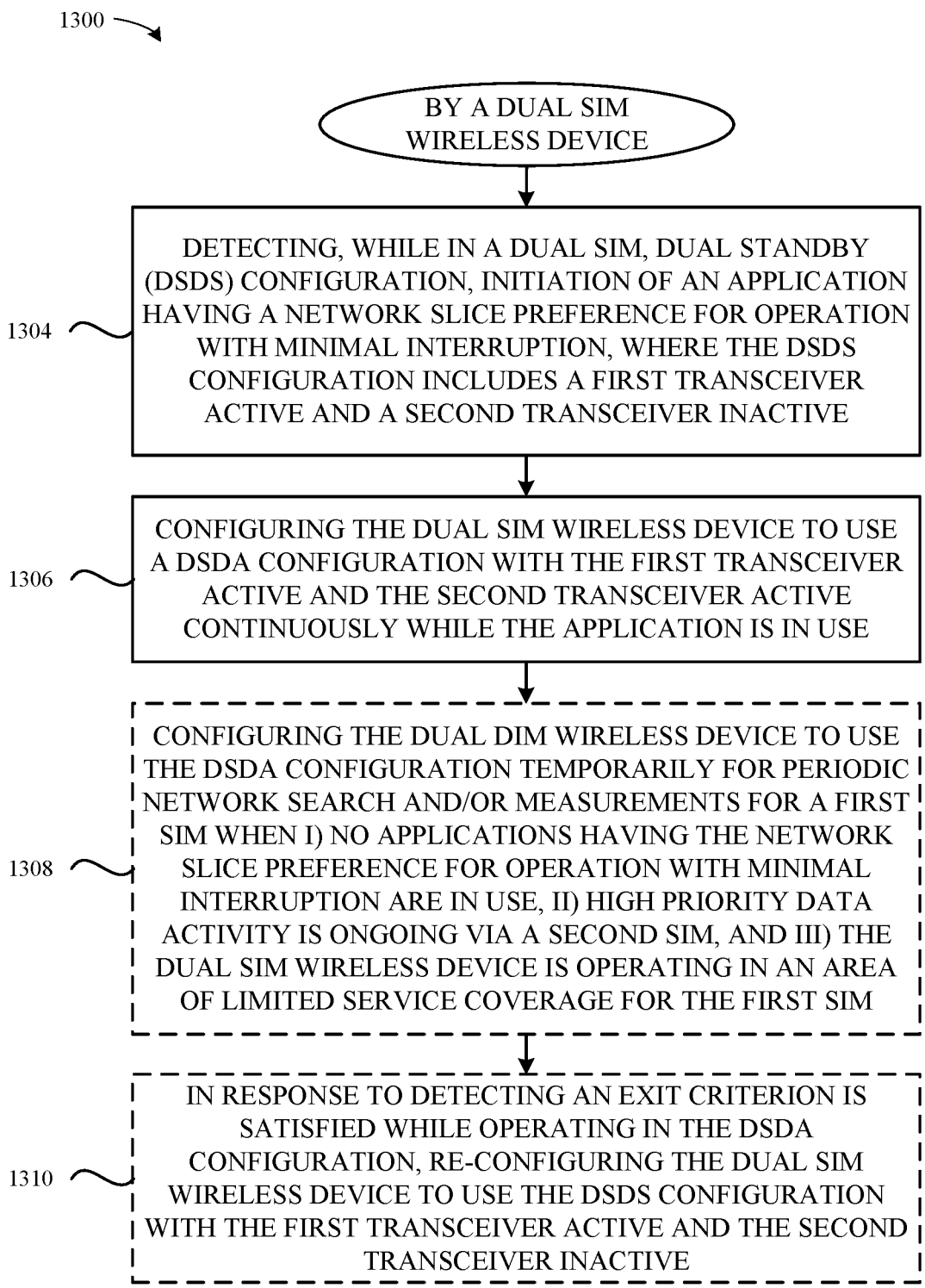
FIG. 13 illustrates a flow chart of an exemplary method for configuring operational modes of a dual SIM/eSIM wireless device, according to some embodiments.

FIG. 13 illustrates a flow chart 1300 of an exemplary method for configuring operational modes of a dual SIM wireless device 102. (Note that the logic applies equally to a dual eSIM 208 wireless device 102 or a SIM and eSIM 208 wireless device 102.) At 1304, the dual SIM wireless device 102 detects, while in a dual SIM, dual standby (DSDS) configuration, initiation of an application having a network slice preference for operation with minimal interruption, where the DSDS configuration includes a first transceiver active (e.g., in a fully powered state) and a second transceiver inactive (e.g., in a power reduced state). At 1306, the dual SIM wireless device 102 is reconfigured to use a dual SIM, dual active (DSDA) configuration, having the first transceiver active and the second transceiver active, continuously while the application is in use. In some embodiments, at 1308, the dual SIM wireless device 102 is reconfigured to use the DSDA configuration temporarily for periodic network search and/or measurements for a first SIM when i) no applications having the network slice preference for operating with minimal interruption are in use, ii) high priority data activity is ongoing via a second SIM, and iii) the dual SIM wireless device is operating in an area of limited service coverage for the first SIM. In some embodiments, at 1310, the dual SIM wireless device 102, in response to detecting an exit criterion is satisfied while operating in the DSDA configuration, re-configures to use the DSDS configuration with the first transceiver active and the second transceiver inactive.

In some embodiments, the exit criterion is satisfied when no applications having the network slice preference for operating requiring minimal interruption are in use. In some embodiments, the exit criterion is satisfied when the dual SIM wireless device reselects cellular connectivity from using a fifth generation (5G) radio access technology (RAT) to a non-5G RAT. In some embodiments, the exit criterion is satisfied when detecting a user action causing a display of the dual SIM wireless device to turn off. In some embodiments, the dual SIM wireless device 102, in response to detecting a re-entry criterion is satisfied while operating in the DSDS configuration, re-configures the dual SIM wireless device to re-use the DSDA configuration with the first transceiver active and the second transceiver inactive. In some embodiments, the re-entry criterion is satisfied when at least one application having the network slice preference for operating requiring minimal interruption initiates or re-initiates operation.

Figure 14:
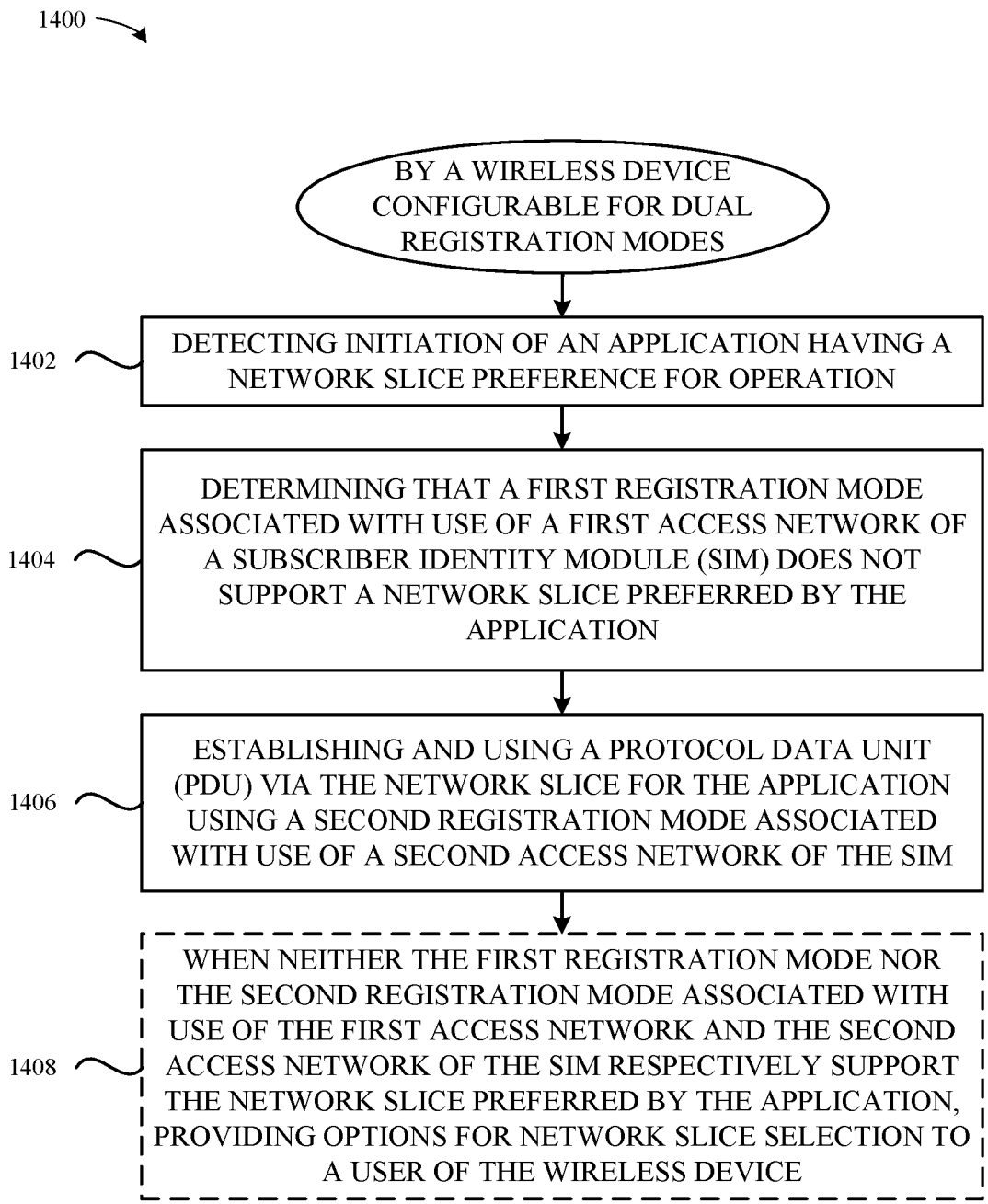
FIG. 14 illustrates a flow chart of an exemplary method for network slice selection by a wireless device configurable for dual registration modes, according to some embodiments.

FIG. 14 illustrates a flow chart 1400 an exemplary method for network slice selection performed by a wireless device 102 that is configurable for dual registration modes. At 1402, the wireless device 102 detects initiation of an application having a network slice preference for operation. At 1404, the wireless device 102 determines that a first registration mode associated with use of a first access network of a subscriber identity module (SIM) does not support a network slice preferred by the application. At 1406, the wireless device 102 establishes and uses a protocol data unit (PDU) via the network slice for the application using a second registration mode associated with use of a second access network of the SIM. In some embodiments, at 1408, when neither the first registration mode nor the second registration mode, associated with use of the first access network and the second access network of the first SIM respectively, support the network slice preferred by the application, the wireless device 102 provides options for network slice selection to a user of the wireless device 102. In some embodiments, the options for network slice selection include options to use a network slice via a different SIM of the wireless device 102.

In some embodiments, the first access network includes a cellular wireless access network, and the second access network includes a non-cellular wireless access network. In some embodiments, the method performed by the wireless device 102 further includes, in response to detecting performance for the application while using the PDU via the network slice through the second access network of the SIM does not satisfy a performance threshold: i) re-checking whether the first registration mode associated with use of the first access network of the SIM supports the network slice preferred by the application, ii) when the first registration mode supports the network slice, establishing and using the PDU via the network slice through the first access network of the SIM for the application, and iii) when the first registration mode continues to not support the network slice, establishing and using a PDU via a default network slice through the first access network of the SIM.

Representative Exemplary Apparatus

Figure 15:
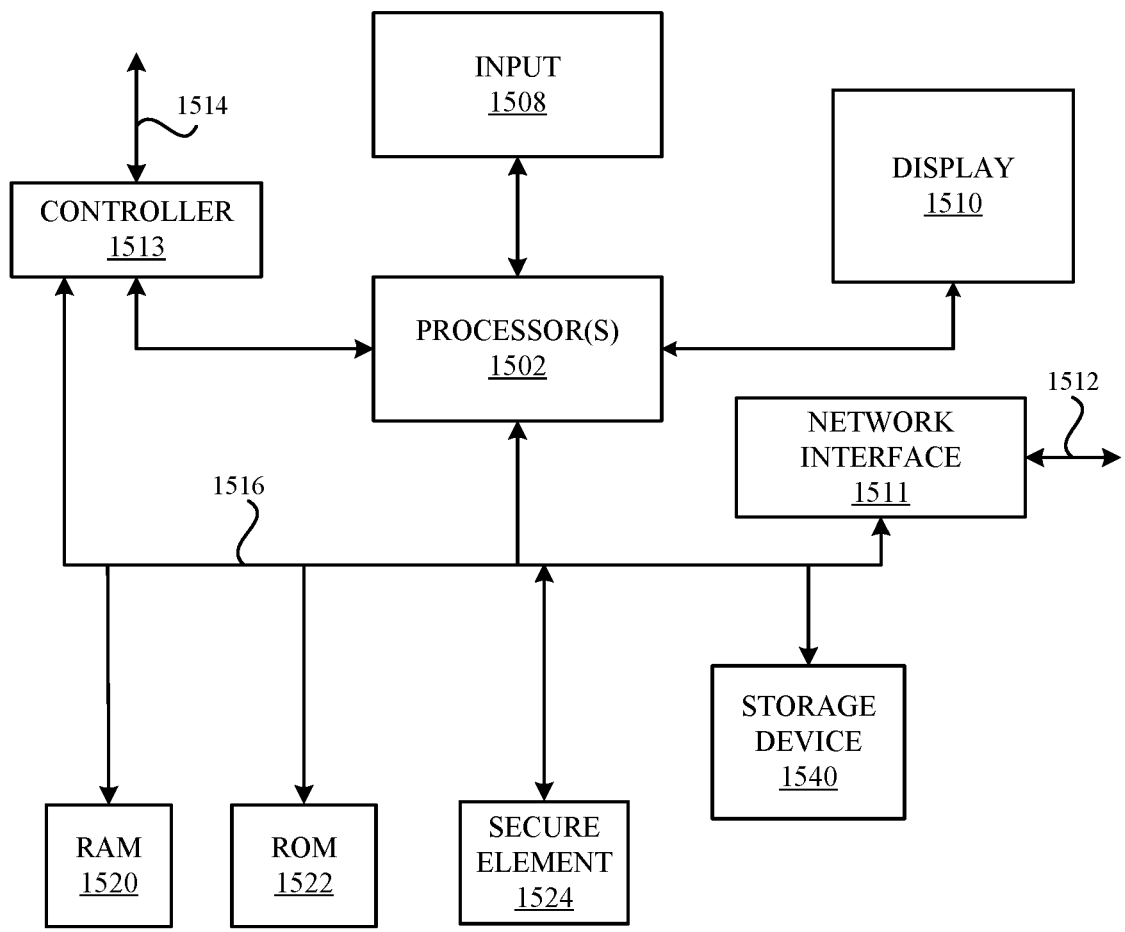
FIG. 15 illustrates a block diagram of exemplary elements of a wireless device, according to some embodiments.

FIG. 15 illustrates in block diagram format an exemplary computing device 1500 that can be used to implement the various components and techniques described herein, according to some embodiments. In particular, the detailed view of the exemplary computing device 1500 illustrates various components that can be included in the mobile wireless device 102. As shown in FIG. 15, the computing device 1500 can include one or more processors 1502 that represent microprocessors or controllers for controlling the overall operation of computing device 1500. In some embodiments, the computing device 1500 can also include a user input device 1508 that allows a user of the computing device 1500 to interact with the computing device 1500. For example, in some embodiments, the user input device 1508 can take a variety of forms, such as a button, keypad, dial, touch screen, audio input interface, visual/image capture input interface, input in the form of sensor data, etc. In some embodiments, the computing device 1500 can include a display 1510 (screen display) that can be controlled by the processor(s) 1502 to display information to the user (for example, information relating to incoming, outgoing, or active communication sessions). A data bus 1516 can facilitate data transfer between at least a storage device 1540, the processor(s) 1502, and a controller 1513. The controller 1513 can be used to interface with and control different equipment through an equipment control bus 1514. The computing device 1500 can also include a network/bus interface 1511 that couples to a data link 1512. In the case of a wireless connection, the network/bus interface 1511 can include wireless circuitry, such as a wireless transceiver and/or baseband component. The computing device 1500 can also include a secure element 1524. The secure element 1524 can include an eUICC 108.

The computing device 1500 also includes a storage device 1540, which can include a single storage or a plurality of storages (e.g., hard drives and/or solid-state drives), and includes a storage management module that manages one or more partitions within the storage device 1540. In some embodiments, storage device 1540 can include flash memory, semiconductor (solid state) memory or the like. The computing device 1500 can also include a Random-Access Memory (RAM) 1520 and a Read-Only Memory (ROM) 1522. The ROM 1522 can store programs, utilities or processes to be executed in a non-volatile manner. The RAM 1520 can provide volatile data storage, and stores instructions related to the operation of the computing device 1500.

Wireless Terminology

In accordance with various embodiments described herein, the terms "wireless communication device," "wireless device," "mobile device," "mobile station," "mobile wireless device," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near-field communication (NFC), a cellular wireless network, a fourth generation (4G) LTE, LTE Advanced (LTE-A), 5G, and/or 6G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different radio access technologies (RATs). In these scenarios, a multi-mode user equipment (UE) can be configured to prefer attachment to a 5G wireless networs offering faster data rate throughput, as compared to other 4G LTE legacy networks offering lower data rate throughputs. For instance, in some implementations, a multi-mode UE may be configured to fall back to a 4G LTE network or a 3G legacy network, e.g., an Evolved High Speed Packet Access (HSPA+) network or a Code Division Multiple Access (CDMA) 2000 Evolution-Data Only (EV-DO) network, when 5G wireless networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for adaptive subscriber identity module (SIM) profile and network slice selection by a dual SIM, dual standby (DSDS) wireless device with a first SIM as a user-designated data-preferred SIM and a second SIM as a user-designated non-data-preferred SIM, the method comprising:
    by the DSDS wireless device:
        determining that the first SIM does not support a network slice preferred by an application;
        using a protocol data unit (PDU) connection, via the network slice of the second SIM, for the application;
        switching cellular data usage from the first SIM to the second SIM; and
        when the application having the network slice preference for operation requires minimal interruption, reducing activity of at least one SIM that is not being used by the application, wherein reducing activity comprises disabling or reducing to a minimum permissible threshold one or more of page monitoring, network search, and/or measurement activity for the at least one SIM.

2. The method of claim 1, further comprising:
    by the DSDS wireless device:
        when the network slice of the second SIM for the application is no longer in use or usage of the first SIM is required:
            switching cellular data usage from the second SIM to the first SIM.

3. The method of claim 2, wherein the network slice of the second SIM for the application is no longer in use when use of the application ends.

4. The method of claim 2, wherein usage of the first SIM is required when an incoming connection request via the first SIM is detected and a non-cellular connection for the incoming connection request is unavailable.

5. The method of claim 2, wherein usage of the first SIM is required when a high priority message request via the first SIM is detected.

6. The method of claim 5, wherein the high priority message request comprises an emergency services or public warning system (PWS) message.

7. The method of claim 1, further comprising:
    by the DSDS wireless device:
        when the first SIM does not support the network slice and usage of the second SIM is disallowed:
            using a PDU connection via a default data network slice of the first SIM for the application.

8. The method of claim 1, further comprising:
    by the DSDS wireless device:
        determining the first SIM supports the network slice for the application while using the PDU connection via the network slice of the second SIM;
        using a PDU connection via the network slice of the first SIM for the application; and
        switching cellular data usage from the second SIM to the first SIM.

9. The method of claim 1, further comprising:
    by the DSDS wireless device:
        determining the network slice of the second SIM for the application is no longer available while using the PDU connection via the network slice of the second SIM; and
        switching cellular data usage including for the application from the second SIM to the first SIM.

10. The method of claim 1, further comprising:
    by the DSDS wireless device:
        when the application having the network slice preference for operation requires minimal interruption, reducing activity of the at least one SIM of the DSDS wireless device that is not being used for the application comprises suppressing interruptions from the first SIM.

11. The method of claim 1, further comprising:
    by the DSDS wireless device:
        when the application having the network slice preference for operation requires minimal interruption, placing the first SIM in a limited service mode while the application uses the network slice via the second SIM.

12. The method of claim 1, wherein reducing activity of the at least one SIM further comprises disabling alerts for short message system (SMS) alerts for the at least one SIM while allowing alerts for emergency services and public warning system (PWS) messages.

13. An apparatus comprising memory coupled to processing circuitry, the processing circuitry configured to:
    determine that a first subscriber identity module (SIM) does not support a network slice preferred by an application;
    use a protocol data unit (PDU) connection, via the network slice of a second SIM, for the application;
    switch cellular data usage from the first SIM to the second SIM; and
    when the application having the network slice preference for operation requires minimal interruption, reduce activity of at least one SIM that is not being used by the application, wherein reduce activity comprises disable or reduce to a minimum permissible threshold one or more of page monitoring, network search, and/or measurement activity for the at least one SIM, wherein:
- the first SIM is a user-designated data-preferred SIM, and
- the second SIM is a user-designated non-data-preferred SIM.

14. The apparatus of claim 13, wherein the processing circuitry is further configured to:
- when the network slice of the second SIM for the application is no longer in use or usage of the first SIM is required, switch cellular data usage from the second SIM to the first SIM.

15. The apparatus of claim 14, wherein the network slice of the second SIM for the application is no longer in use when use of the application ends.

16. The apparatus of claim 14, wherein usage of the first SIM is required when an incoming connection request via the first SIM is detected and a non-cellular connection for the incoming connection request is unavailable.

17. The apparatus of claim 14, wherein:
- usage of the first SIM is required when a high priority message request via the first SIM is detected; and
- the high priority message request comprises an emergency services or public warning system (PWS) message.

18. The apparatus of claim 13, wherein the processing circuitry is further configured to:
- when the first SIM does not support the network slice and usage of the second SIM is disallowed, use a PDU connection via a default data network slice of the first SIM for the application.

19. The apparatus of claim 13, wherein the processing circuitry is further configured to:
- determine the first SIM supports the network slice for the application while using the PDU connection via the network slice of the second SIM;
- use a PDU connection via the network slice of the first SIM for the application; and
- switch cellular data usage from the second SIM to the first SIM.

20. A dual subscriber identity module (SIM) dual standby (DSDS) wireless device comprising:
- one or more antennas;
- one or more secure elements storing a first SIM and a second SIM; and
- processing circuitry communicatively coupled to the one or more antennas and to the one or more secure elements, the processing circuitry configured to:
  - determine that a first subscriber identity module (SIM) does not support a network slice preferred by an application;
  - use a protocol data unit (PDU) connection, via the network slice of a second SIM, for the application;
  - switch cellular data usage from the first SIM to the second SIM; and
  - when the application having the network slice preference for operation requires minimal interruption, reduce activity of at least one SIM that is not being used by the application, wherein reduce activity comprises disable or reduce to a minimum permissible threshold one or more of page monitoring, network search, and/or measurement activity for the at least one SIM, wherein:
- the first SIM is a user-designated data-preferred SIM, and
- the second SIM is a user-designated non-data-preferred SIM.

* * * * *